United States Patent
Kramp et al.

(10) Patent No.: US 12,080,192 B2
(45) Date of Patent: Sep. 3, 2024

(54) CONTAINER WITH MAGNETICALLY OPERATED LATCHING MECHANISM AND OPENER TOOL

(71) Applicant: THERMO EBERLINE LLC, Oakwood Village, OH (US)

(72) Inventors: Keith G. Kramp, Willoughby, OH (US); Douglas B. Allen, Cuyahoga Falls, OH (US); Alexandria L. Magyar, North Royalton, OH (US); Patrick L. Cole, Brecksville, OH (US)

(73) Assignee: Thermo Eberline LLC, Oakwood Village, OH (US)

( * ) Notice: Subject to any disclaimer, the term of this patent is extended or adjusted under 35 U.S.C. 154(b) by 856 days.

(21) Appl. No.: 17/087,984

(22) Filed: Nov. 3, 2020

(65) Prior Publication Data
US 2021/0130049 A1  May 6, 2021

Related U.S. Application Data

(60) Provisional application No. 62/931,575, filed on Nov. 6, 2019.

(51) Int. Cl.
G09F 3/20 (2006.01)
(52) U.S. Cl.
CPC .................................. *G09F 3/207* (2013.01)
(58) Field of Classification Search
CPC ........ E05B 73/0023; B65D 2251/1058; B65D 43/22; A45C 11/00; B25B 27/02; G09F 3/207
USPC ......... 220/315; 29/426.6; 81/3.57, 3.55, 8.1; 206/37, 1.5, 580, 234, 308.1, 310; 70/63; 292/8
See application file for complete search history.

(56) References Cited

U.S. PATENT DOCUMENTS

| | | |
|---|---|---|
| 3,283,153 A | 11/1966 | Geiger |
| 4,975,589 A | 12/1990 | Chamberlain et al. |
| 5,722,705 A | 3/1998 | Deguchi |

(Continued)

FOREIGN PATENT DOCUMENTS

| | | |
|---|---|---|
| EP | 2112528 A1 | 10/2009 |
| JP | S609740 Y2 | 4/1985 |

OTHER PUBLICATIONS

EP20885696.3, Extended European Search Report, Oct. 26, 2023, 10 pages.

(Continued)

*Primary Examiner* — Rafael A Ortiz
(74) *Attorney, Agent, or Firm* — William R McCarthy, III

(57) ABSTRACT

A container has a container portion defining a cavity configured to receive a pin, and a pin disposed in the cavity. The pin is movable within the cavity between a first position and a second position. A spring is disposed in the cavity and configured to bias the pin toward the first position. The container includes a cover movable between an open position and a closed position, the cover having a recess configured to receive the pin. The cover further includes an angled surface configured to contact and move the pin toward the second position to compress the spring as the cover is closed. The recess of the cover is configured to align with the cavity of the container portion when the cover is closed such that the spring moves the pin to the first position and the pin is received in the recess to lock the cover in closed.

20 Claims, 16 Drawing Sheets

(56) References Cited

U.S. PATENT DOCUMENTS

| | | | | |
|---|---|---|---|---|
| 5,950,296 | A * | 9/1999 | Tatsumi | B25B 31/00 |
| | | | | 292/84 |
| 6,732,861 | B2 * | 5/2004 | Aarts | E05B 73/0023 |
| | | | | 206/308.2 |
| 6,775,836 | B2 * | 8/2004 | Joung | G11B 17/0405 |
| | | | | 720/639 |
| 6,931,895 | B1 * | 8/2005 | Ahn | E05B 73/0023 |
| | | | | 70/57.1 |
| 6,955,068 | B2 * | 10/2005 | Gelardi | E05B 73/0023 |
| | | | | 70/57.1 |
| 7,234,739 | B2 | 6/2007 | Saitoh et al. | |
| 7,266,831 | B2 * | 9/2007 | Bak | G11B 33/0422 |
| | | | | 720/728 |
| 2005/0150892 | A1 | 7/2005 | Miller | |
| 2006/0108252 | A1 * | 5/2006 | Lax | A45C 11/00 |
| | | | | 206/308.1 |
| 2007/0120372 | A1 * | 5/2007 | Zhang | G06F 1/1616 |
| | | | | 292/8 |
| 2007/0134061 | A1 * | 6/2007 | Nance | E05B 47/0045 |
| | | | | 403/DIG. 1 |
| 2009/0242433 | A1 * | 10/2009 | Van Bergen | B25H 3/003 |
| | | | | 206/234 |
| 2012/0018652 | A1 | 1/2012 | Yoder et al. | |

OTHER PUBLICATIONS

PCT/US2020/058662, Search Report and Written Opinion, Feb. 2, 2021, 9 pages.

* cited by examiner

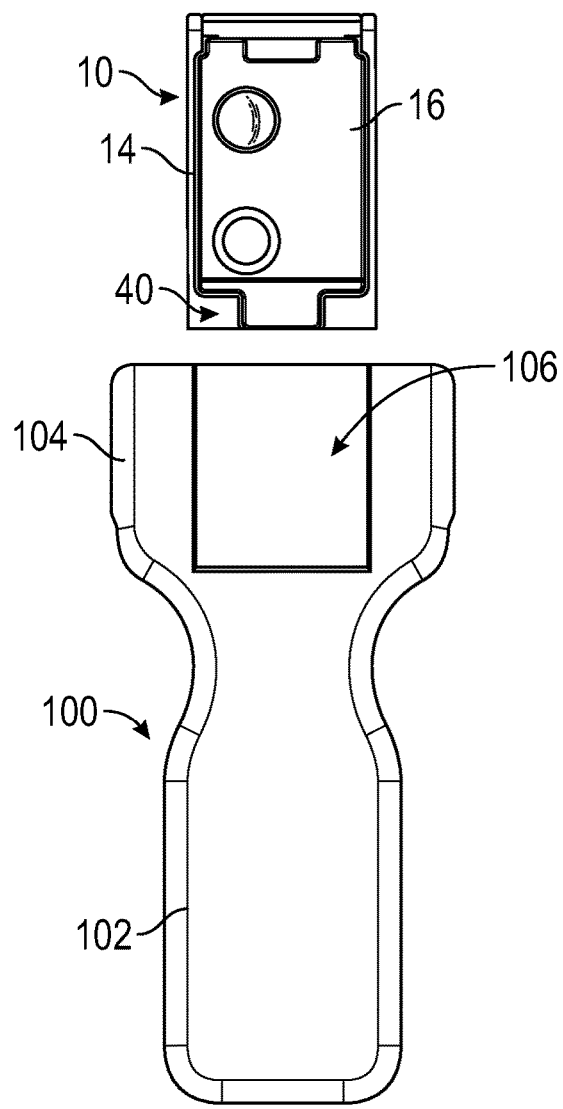
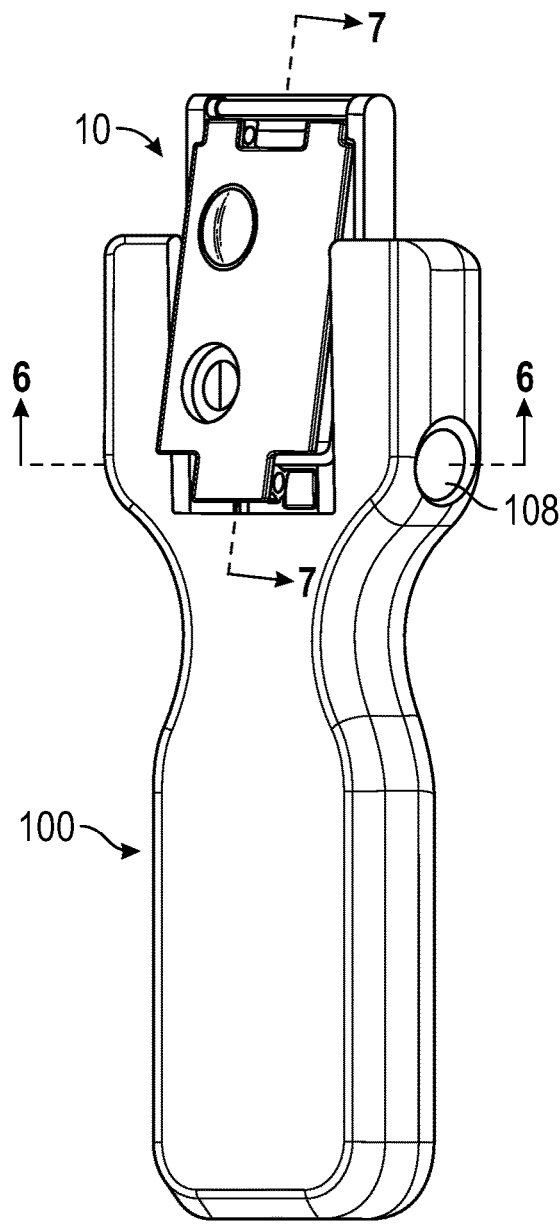
FIG. 4
FIG. 5

CONTAINER WITH MAGNETICALLY OPERATED LATCHING MECHANISM AND OPENER TOOL

CROSS-REFERENCE TO RELATED APPLICATIONS

The present application claims the priority benefit from U.S. patent application Ser. No. 62/931,575, filed Nov. 6, 2019, which is hereby incorporated by reference herein in its entirety for all purposes.

FIELD

The present disclosure pertains to containers with magnetically operated latching mechanisms, such as containers for thermoluminescent dosimeter cards.

BACKGROUND

Thermoluminescent dosimeter (TLD) cards are used to record the accumulated radiation exposure of a wearer, such as individuals working with radiation sources. TLD cards can include one or several TLD elements and/or filters assembled or stacked in a holder or container known as a "card." The TLD cards, in turn, can be placed in containers or holders that can be worn on the user's clothing over selected parts of the body to record radiation doses received by that individual. To prevent tampering and/or accidental opening of the card holder, existing card holders typically include one or more clasps that are designed to be opened with a specialized tool or key in a levering or prying action. Such tools can be cumbersome, and considerable time and effort can be required to open the card holder to access the TLD card. Accordingly, there exists a need for improvements to containers for TLD cards.

SUMMARY

Certain embodiments of the disclosure pertain to tamper-resistant containers with magnetically-operated latching assemblies. In a representative embodiment, a container comprises a container portion defining a cavity configured to receive a pin member, and a pin member disposed in the cavity of the container portion. The pin member is movable within the cavity between a first position and a second position. A biasing member is disposed in the cavity and configured to bias the pin member toward the first position. The container further comprises a cover or insert movable relative to the container portion between an open position and a closed position, the cover or insert comprising a recess configured to receive the pin member when the cover or insert is in the closed position. The cover or insert further comprises an angled surface configured to contact the pin member and move the pin member toward the second position in the cavity to compress the biasing member as the cover or insert is moved to the closed position. The recess of the cover or insert is configured to align with the cavity of the container portion when the cover or insert is in the closed position such that the biasing member moves the pin member to the first position and the pin member is at least partially received in the recess of the cover or insert to lock the cover or insert in the closed position.

In any or all of the disclosed embodiments, the cover or insert is a cover, the cover is pivotably coupled to the container portion, and is configured to cover an interior volume of the container portion when in the closed position.

In any or all of the disclosed embodiments, the pin member is one of a pair of pin members of a latching assembly of the container portion positioned on opposite sides of a recess defined in the container portion.

In any or all of the disclosed embodiments, the cover comprises a projection configured to be received in the recess between the pin members of the container portion, and the recess of the cover is defined in the projection of the cover.

In any or all of the disclosed embodiments, the cover or insert is an insert, and the insert is configured to be received in the container portion in the closed position.

In any or all of the disclosed embodiments, the insert comprises a tray portion and an extension portion extending from the tray portion, the recess of the insert being defined in the extension portion.

In any or all of the disclosed embodiments, the extension portion comprises the angled surface.

In any or all of the disclosed embodiments, the pin member is one of a pair of pin members of a latching assembly of the container portion positioned on opposite sides of a recess defined in the container portion, the extension portion is one of a pair of extension portions of the insert, and when the insert is in the closed position, the pin members of the latching assembly are positioned between the extension portions of the insert.

In any or all of the disclosed embodiments, an end portion of the pin member comprises a tapered, beveled, or chamfered surface.

In any or all of the disclosed embodiments, the pin member comprises a ferrous metal.

In any or all of the disclosed embodiments, the container is configured to receive a thermoluminescent dosimeter card.

In another representative embodiment, a system comprises a container, and the container comprises a container portion comprising a latching assembly. The latching assembly comprises a pin member and a biasing member disposed in a cavity defined in the container portion. The container further comprises a cover coupled to the container portion and movable between an open position and a closed position to enclose or cover an interior volume of the container portion, the cover comprising a recess configured to align with the cavity in the container portion and receive the pin member when the cover is in the closed position. The system further comprises a tool assembly comprising a slot configured to receive the container, and a magnet positioned so as to align with the pin member of the container when the container is received in the slot. The magnet is configured to attract the pin member toward the magnet to compress the biasing member and unlatch the cover from the container portion.

In any or all of the disclosed embodiments, the tool assembly further comprises a first cartridge configured to receive the container, a second cartridge spaced apart from the first cartridge, and a shuttle movable between the first and second cartridges, the shuttle comprising the slot configured to receive the container.

In any or all of the disclosed embodiments, the tool assembly further comprises a manipulator assembly configured to engage a thermoluminescent dosimeter card contained in the container once the container is opened, and remove the thermoluminescent dosimeter card from the container.

In any or all of the disclosed embodiments, the slot is a first slot, and the shuttle further comprises a second slot configured to receive the thermoluminescent dosimeter card.

In any or all of the disclosed embodiments, the tool assembly further comprises a pair of ramp members configured to engage the cover and pivot the cover to the open position once unlatched as the shuttle moves past the ramp members.

In any or all of the disclosed embodiments, the tool assembly further comprises a roller member configured to press the cover toward the closed position to align the recess and the cavity such that the magnet of the tool assembly can pull the pin member out of the recess to unlatch the cover.

In any or all of the disclosed embodiments, the tool assembly is a handheld tool assembly comprising a handle portion and a tool head portion, the slot is defined in the tool head portion, and the magnet of the tool assembly is positioned in a closed end of the slot, but may be positioned anywhere along the length of the slot.

In any or all of the disclosed embodiments, the tool assembly comprises a base member having a curved upper surface, and the slot is defined in the base member.

In another representative embodiment, a method of using any or all of the systems described herein comprises opening the container with the tool assembly, and removing a thermoluminescent dosimeter card from the container.

In another representative embodiment, a container comprises a container portion having a first end portion and a second end portion, the second end portion defining a first cavity and a second cavity configured to receive pin members, the first and second cavities being spaced apart by a recess. The container further comprises a first pin member disposed in the first cavity of the container portion and movable within the first cavity between a first position and a second position, and a first spring disposed in the first cavity and configured to bias the first pin member toward the first position. The container further comprises a second pin member disposed in the second cavity of the container portion and movable within the second cavity between a first position and a second position, and a second spring disposed in the second cavity and configured to bias the second pin member toward the first position. The container further comprises a cover coupled to the first end portion of the container portion and movable relative to the container portion between an open position and a closed position, the cover comprising a projection configured to be received in the recess of the container portion when the cover is in the closed position. The projection comprises a first angled surface configured to contact the first pin member and move the first pin member toward the second position in the first cavity, the projection further comprising a second angled surface configured to contact the second pin member and move the second pin member toward the second position in the second cavity as the cover is moved to the closed position. The projection is configured to receive the first and second pin members when the cover is in the closed position to lock the cover in the closed position.

In another representative embodiment, a container comprises a container portion defining an interior volume configured to receive an object and a cover operable to at least partially cover the container portion to enclose the interior volume. One of the container portion or the cover defines a cavity comprising a pin member disposed in the cavity, the pin member being movable within the cavity between a first position and a second position. The cavity further comprises a biasing member disposed in the cavity and configured to bias the pin member toward the first position. The other of the container portion or the cover defines a recess configured to receive the pin member when the container portion is covered by the cover, and comprises an angled surface configured to contact the pin member and move the pin member toward the second position in the cavity to compress the biasing member as the cover moves relative to the container portion. The recess of the container portion or of the cover is configured to align with the cavity of the other of the container portion or the cover when the cover encloses the interior volume of the container portion such that the biasing member moves the pin member to the first position and the pin member is at least partially received in the recess to secure the container portion and the cover together.

The foregoing and other objects, features, and advantages of the disclosed technology will become more apparent from the following detailed description, which proceeds with reference to the accompanying figures.

BRIEF DESCRIPTION OF THE DRAWINGS

FIG. 4 is a top plan view of a representative embodiment of a handheld opener tool assembly and the container of FIG. 1.

FIG. 5 is a perspective view of the container of FIG. 1 received in the opener tool assembly of FIG. 4 with the cover in the unlatched state.

DETAILED DESCRIPTION

The present disclosure pertains to tamper-resistant, shock-resistant containers with magnetically operable or actuatable latching mechanisms, and associated systems for opening such containers. The containers can be useful for housing, for example, sensitive objects or items such as thermoluminescent dosimeter (TLD) cards. In certain configurations, the containers can include a container portion and a clam shell cover, or an insert configured to be received in the container portion. The container portion can include a latching assembly including a pin member and spring disposed in a cavity or housing, and configured to engage a corresponding recess or opening on the cover or insert to lock the cover or insert to the container portion when in the closed position. When the cover or insert is in the closed position, the entire latching assembly can be enclosed within the container portion and the cover or insert, such that the latching assembly cannot be seen or accessed from the outside. The latching assembly can be unlatched by applying a magnetic field at the appropriate location adjacent each pin member of the latching assembly. The magnetic field can attract (or repel) the pin member such that the pin member moves out of latching engagement with the cover or insert, compressing the spring, and allowing the container to be opened or the insert to be removed.

Figure 1:
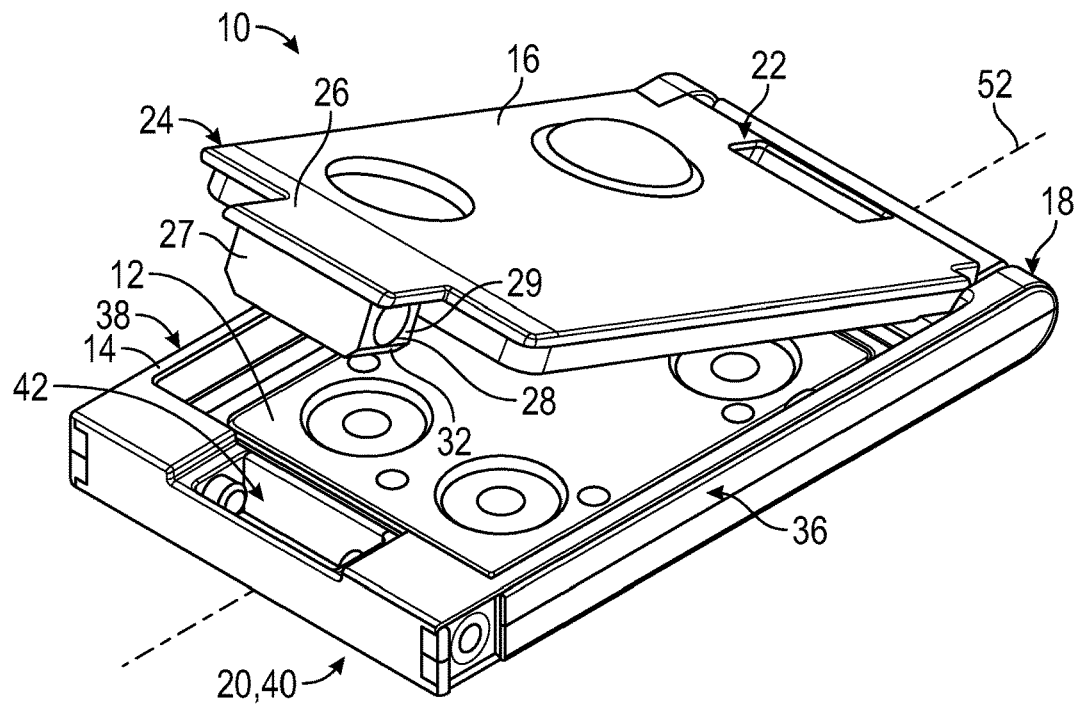
FIG. 1 is a perspective view of a container including a magnetically actuatable latching mechanism, according to one embodiment.
Figure 2:
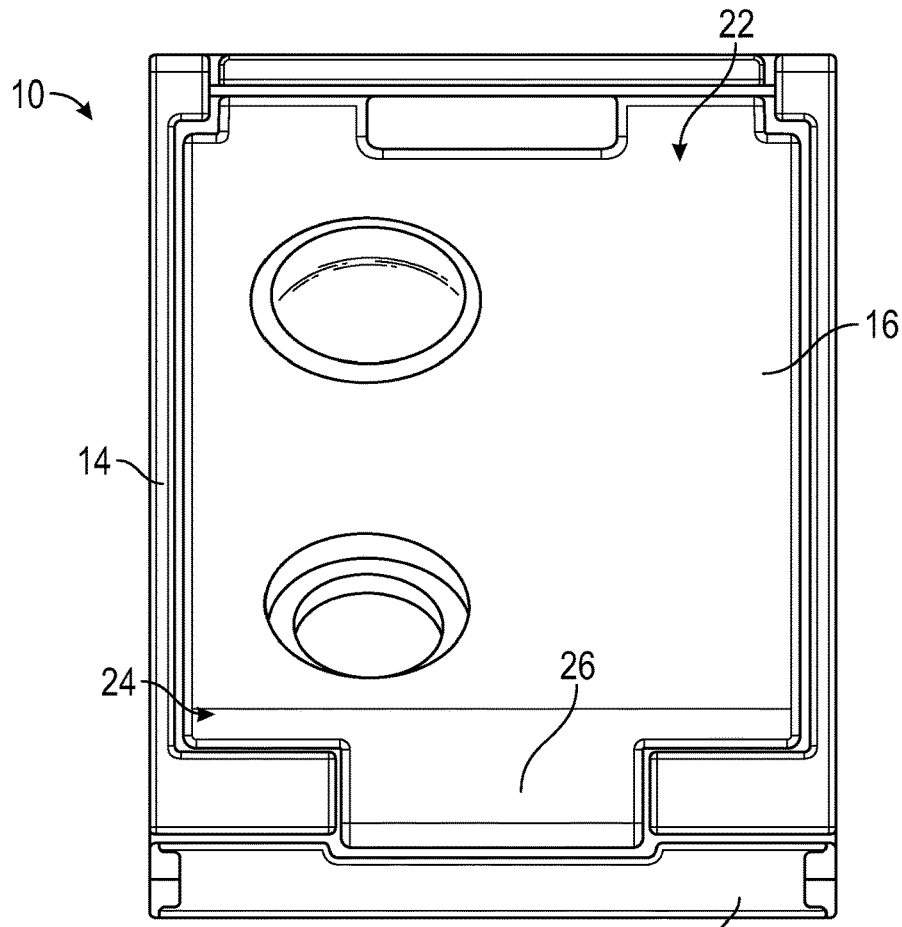
FIG. 2 is a top perspective view of the container of FIG. 1 with the cover in the closed position.

FIGS. 1 and 2 illustrate a representative embodiment of a housing or container 10 configured to receive a TLD card 12. The container 10 can comprise a base or container portion 14 and a cover portion 16 pivotably coupled to the container portion and movable between an open position (FIG. 1) and a closed position (FIG. 2). In the illustrated embodiment, the container 10 is configured as a clam shell container in which the container portion 14 defines an interior volume, receptacle, tray, or well 70 configured to receive the TLD card 12 (or other object), and comprises a first end portion 18 and a second end portion 20. The cover portion 16 also comprises a first end portion 22 and a second end portion 24, and is pivotably coupled to the first end portion 18 of the container portion 14.

Figure 3A:
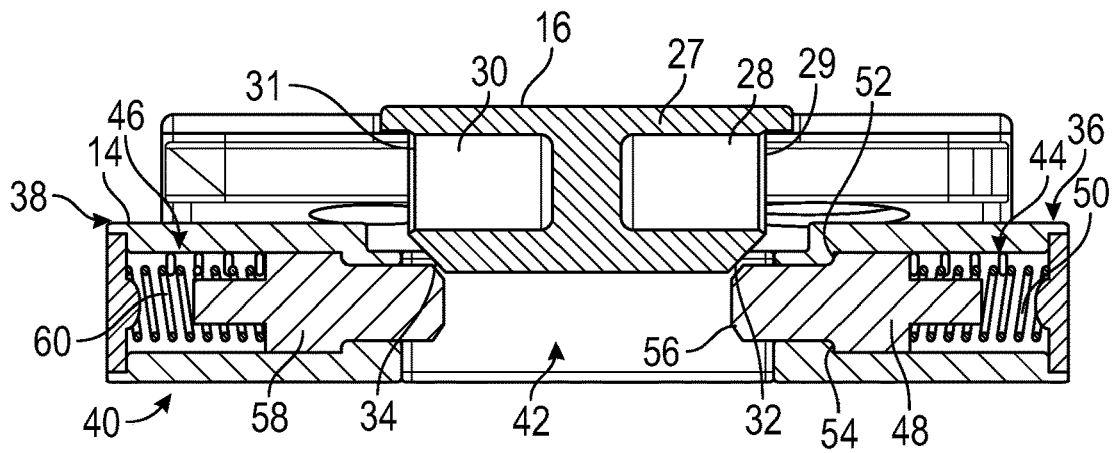
FIGS. 3A-3C are cross-sectional front elevation views illustrating closing and latching of the cover of the container of FIG. 1.

The cover portion 16 can include a projection, tongue, or extension portion 26 located at the second end portion 24. The extension portion 26 can comprise a projection 27 extending from the extension portion 26 (e.g., downwardly in a direction toward the container portion 14 when the cover portion is in the closed position). Referring to FIGS. 1 and 3A, the projection 27 can comprise lateral or side surfaces 29 and 31 on opposite ends of the projection. The side surface side 29 can define an opening or recess 28 (FIGS. 1 and 3A), and the side surface 31 can define an opening or recess 30 on the opposite end of the projection (FIG. 3A). The recesses 28 and 30 can extend at least partially through the projection 27 in a direction perpendicular to a longitudinal axis 52 (FIG. 1) of the container. In certain embodiments, the openings 28 and 30 can extend all the way through the projection 27 such that the projection defines a passage connecting the openings.

With reference to FIG. 3A, the projection 27 can comprise an angled surface 32 adjacent the opening 28 and an angled surface 34 adjacent the opening 30. The angled surfaces 32 and 34 (also referred to as "strike surfaces") can be disposed beneath the openings 28 and 30 such that the surfaces are spaced apart or offset from the openings in a direction toward the container portion 14 at least when the cover is in the closed position. In the illustrated embodiment, the surface 32 is angled toward a side portion 36 of the container portion 14, and forms an acute angle with the bottom panel of the container portion. The surface 34 is angled toward a side portion 38 on the opposite side of the container portion from the side portion 36, and also forms an acute angle with the bottom panel of the container portion.

Figure 3B:
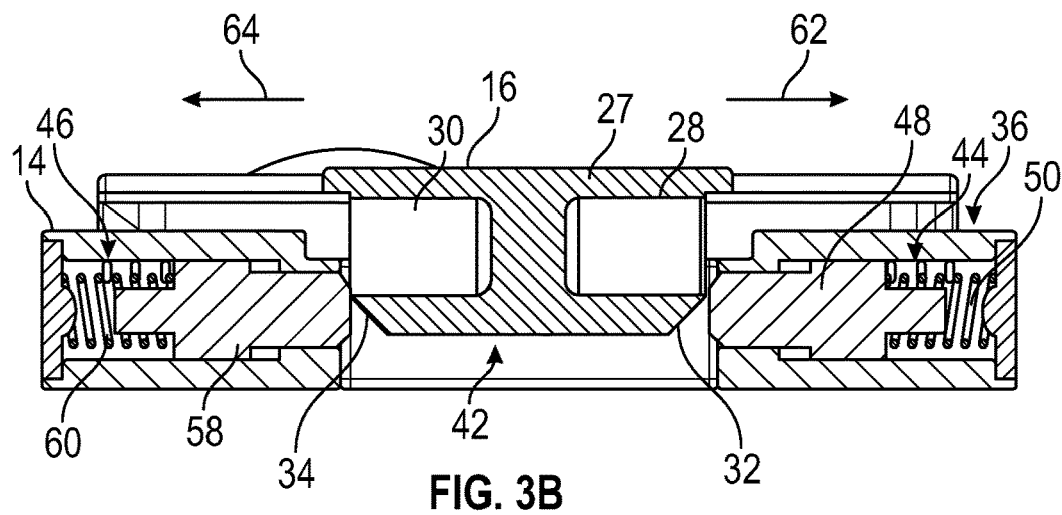

Still referring to FIGS. 1 and 3A, the second end portion 20 (FIG. 1) of the container portion 14 can comprise a latching assembly or locking assembly 40 that is configured to engage the projection 27 of the cover portion. The second end portion 20 can define a central recess 42 with an opening above, and recesses, cavities, or chambers 44, 46 (FIG. 3A) located on both sides of the central recess 42 and in communication with the central recess. Referring to FIG. 3A, the chamber 44 can comprise a pin member 48 and a biasing member configured as a coil spring 50. The pin member 48 can be movable within the chamber 44 between a first position (FIGS. 3A and 3C) and a second position (FIG. 3B). The coil spring 50 can bias the pin member 48 toward the first position. The pin member 48 can comprise an annular shoulder or flange 52 configured to abut or engage a corresponding surface, shoulder, or flange 54 of the chamber 44 when the pin is in the first position. The end portion of the pin member 48 can also comprise a tapered, beveled, rounded, or chamfered surface 56. In the illustrated embodiment, the surface 56 is chamfered, although other configurations are possible. In certain embodiments, the angle of the chamfered surface 56 can be equal or approximately equal to the angle of the surface 32. In the illustrated embodiment, the chamber 46 can comprise a pin member 58 and a coil spring 60 configured similarly to the pin member 48 and the spring 50, although other configurations are possible.

In certain embodiments, sealing members (e.g., gaskets) may be included in embodiments where water resistance is desired. For example, in certain embodiments a sealing member can be disposed around the perimeter of the TLD card 12, or any portion thereof In certain embodiments, a sealing member can extend between the projection 27 and the bottom surface of the recess 42.

Figure 3C:
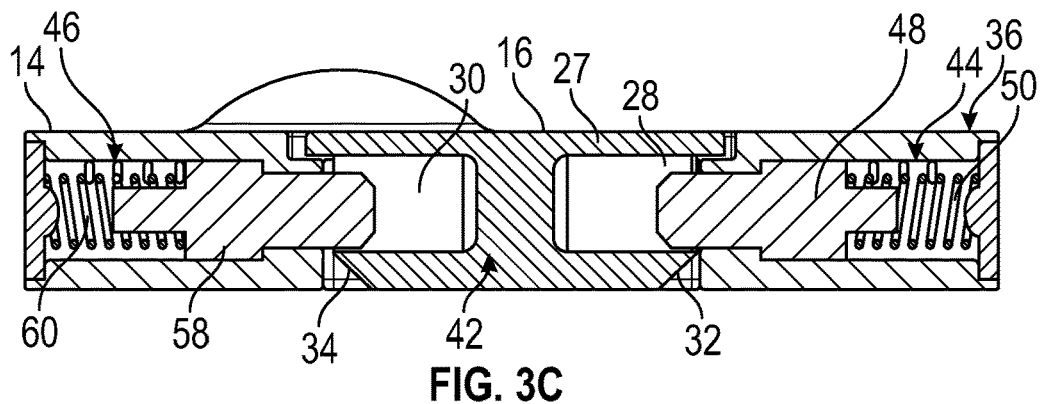

FIGS. 3A-3C illustrate the interaction of the various components of the latching assembly 40 when the cover member 16 is moved to the closed position. Referring to FIGS. 3A and 3B, when the cover member 16 is moved toward the closed position, the angled surfaces 32 and 34 can contact the chamfered surfaces of the pin members 48 and 58, urging or pushing the pin members outwardly in the directions of respective arrows 62 and 64 as the projection 27 is received into the recess 42. In other words, the angled surfaces 32 and 34 can act as strike plates, and move the pin members 48 and 58 to the second position shown in FIG. 3B, in which the springs 50 and 60 are compressed, in order to accommodate the projection 27.

Referring to FIG. 3C, when the projection 27 has moved a sufficient distance into the recess 42, the recesses 28 and 30 can become aligned with the pin members 48 and 58, allowing the springs to push the pin members back toward the first position. In the closed position illustrated in FIG. 3C, the pin members 48 and 58 are at least partially received in the corresponding recesses 28 and 30 of the projection 27, latching or locking the cover member 16 in the closed position. When the cover is in the closed position, the pin members and the springs are completely enclosed by the structure of the container portion and the cover, and are inaccessible. The interior volume 70 and the TLD card 12 (or other object in the well) are also covered by the cover when the cover is in the closed position.

Figure 6:
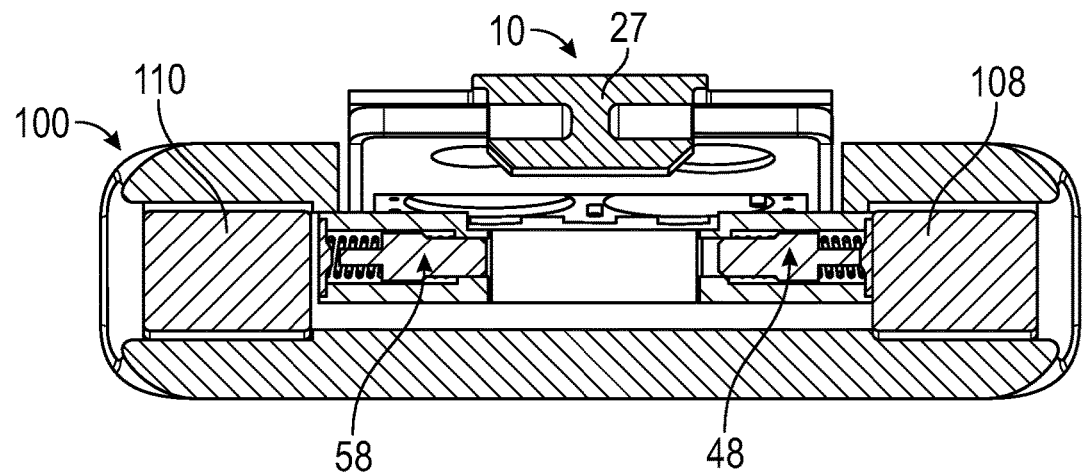
FIG. 6 is a cross-sectional front elevation view of the container of FIG. 1 received in the slot of the opener tool assembly of FIG. 4, taken along line 6-6 of FIG. 5.

In certain embodiments, the pin members 48 and 50 can comprise a ferrous metal. Accordingly, application of a magnet field of sufficient strength at opposite ends of the latching assembly 40 can cause the pin members 48 and 58 to move to the second position. This can compress the springs 50 and 60 and unlatch the cover member 16, allowing the container to be opened. FIGS. 4-7 illustrate a representative embodiment of a handheld tool assembly 100 which can be configured to open the container 10. The tool assembly 100 can comprise a handle portion 102 and a tool head portion 104. The tool head portion 104 can define a channel, recess, or slot 106 sized and shaped to receive the container 10. Referring to FIGS. 5 and 6, the tool head portion 104 can further comprise magnets 108 and 110 positioned at a proximal end or closed end of the slot 106 on opposite sides of the channel. The magnets 108 and 110 can be positioned to align with the latching assembly 40 when the container 10 is received in the slot 106. In other embodiments, the magnets can be positioned at the open end of the slot 106, and/or at any location along the length of the slot.

When the container 10 is advanced into the slot 106, the magnet 108 of the tool assembly can be aligned with the pin member 48 of the container portion 14, and the magnet 110 of the tool assembly can be aligned with the pin member 58 of the container portion. The magnets can be configured such that an attractive force exerted between the pin member 48 and the magnet 108, and between the pin member 58 and the magnet 110, is sufficient to pull or draw the pin members to the second position to unlatch the projection 27.

Figure 7:
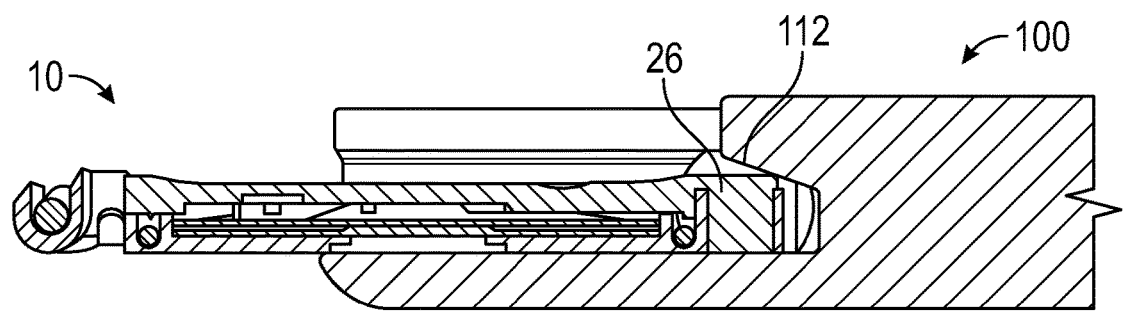
FIG. 7 is a cross-sectional side elevation view of the tool head portion of the opener tool assembly of FIG. 4 and the container of FIG. 1 taken along line 7-7 of FIG. 5, illustrating an angled surface of the slot.

Referring to FIG. 7, in certain embodiments, the proximal end portion of the slot 106 can comprise an angled upper surface 112 configured as a ramp. The angled surface 112 can be configured to engage the extension portion 26 and/or the projection 27 when the container is received in the slot 106. In embodiments in which a sealing member is disposed around the TLD card, the angled surface 112 can be configured to press down on the extension portion 26, thereby compressing the sealing member in the container and allowing the recesses 28 and 30 to more completely align with the pin members 48 and 58. This can allow the magnets 108 and 110 to overcome any friction force between the pin members caused by misalignment between the recesses 28, 30 and the pin members. In embodiments including a sealing member, expansion of the sealing member when the container is retracted from the slot 106 can push the projection 27 upwardly to assist in opening the container. The angled surface 112 can extend across the width of the slot 106, or any portion thereof. For example, in certain embodiments the angled surface 112 can be located at the center of the slot 106.

In certain embodiments, the magnets 108, 110 and/or the pin members 48 and 58 can comprise any of a variety of permanent magnets, electromagnets, and/or magnetic materials. For example, as noted above, in certain embodiments the pin members 48 and 58 can comprise a ferrous metal such as iron or iron alloys, including steel. In certain embodiments, the magnets 108 and 110 can comprise rare-earth metal magnets, such as neodymium magnets. In certain embodiments, the pin members can comprise magnets coupled to the pin members. For example, in certain embodiments the pin members can comprise non-magnetic materials such as any of various ceramics, non-ferrous metals such as aluminium, copper, brass, etc., integrally formed with or coupled to a magnetic or ferrous metal element.

Figure 8:
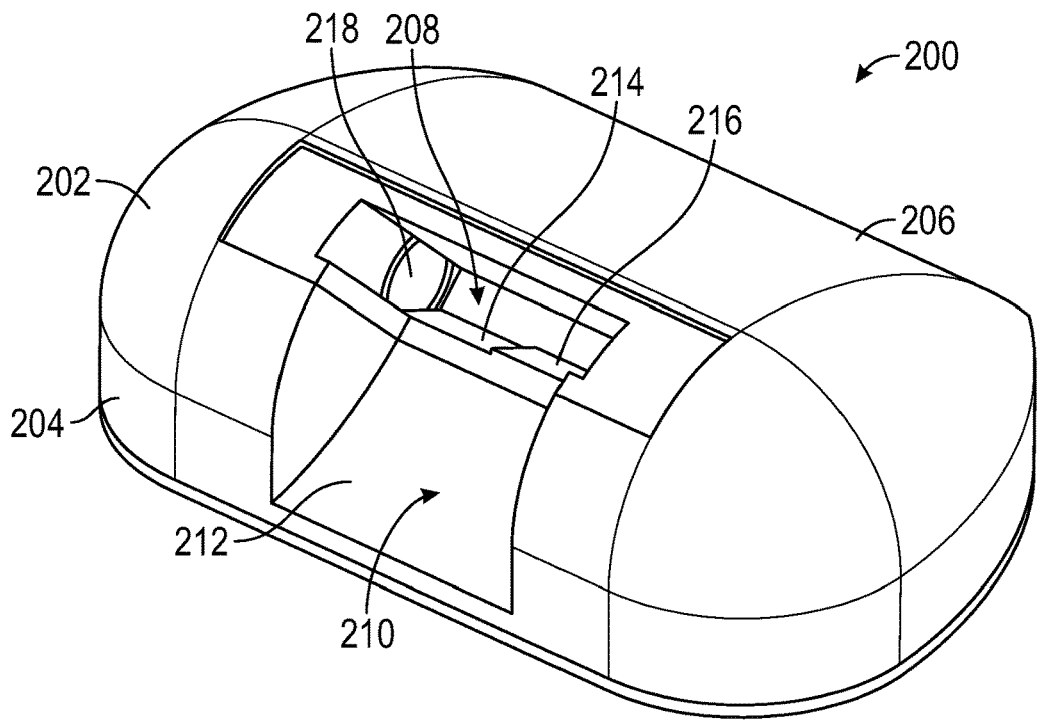
FIG. 8 is a perspective view of another embodiment of an opener tool assembly.
Figure 9:
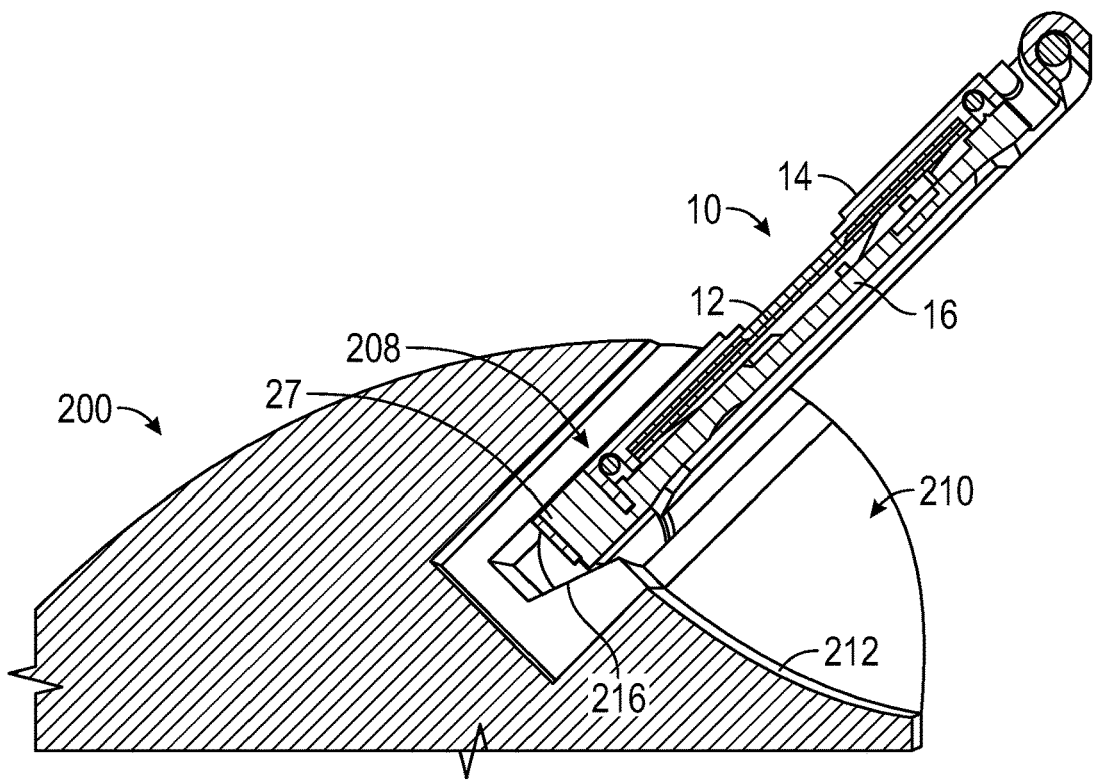
FIG. 9 is a cross-sectional view of a portion of the opener tool assembly of FIG. 8 illustrating the container of FIG. 1 received in the slot of the opener tool assembly.

FIGS. 8 and 9 illustrate another embodiment of a tool assembly 200 configured to open the container 10, and configured to be placed on a flat surface for use. The tool assembly 200 can comprise a housing 202 including a base portion 204 having a flat lower surface, and a domed upper surface 206. The housing 202 can define a slot 208 shaped to receive the container 10. A recess 210 comprising a sloped or curved surface 212 can extend from the slot 208 toward the base portion 204 such that the slot and the recess are in communication. The slot 208 defines a lower surface or floor 214 located toward the closed end of the slot. The floor 214 can comprise a raised surface or extension portion 216 extending into the slot. The housing 202 can further comprise a pair of magnets 218 disposed in an opposing arrangement at the closed end of the slot 208 (one magnet 218 is visible in FIG. 8), similar to the tool assembly 100.

FIG. 9 illustrates a container 10 inserted into the slot 208, with the tool assembly 200 and the container shown in cross-section. In certain embodiments, the extension portion 216 can compress a sealing member disposed in the recess 42 (FIG. 3A) of the container 10, allowing the magnets 218 to pull the pins 48 and 58 out of engagement with the projection 27, as described above. Once unlatched, the cover portion 16 can swing open through the recess 210, allowing a TLD card 12 disposed in the container 10 to fall from the container and be directed along the sloped surface 212. In certain embodiments, the tool assembly 200 can comprise a cartridge configured to receive empty TLD card containers, for example attached to or integrated with the housing 202.

Figure 10:
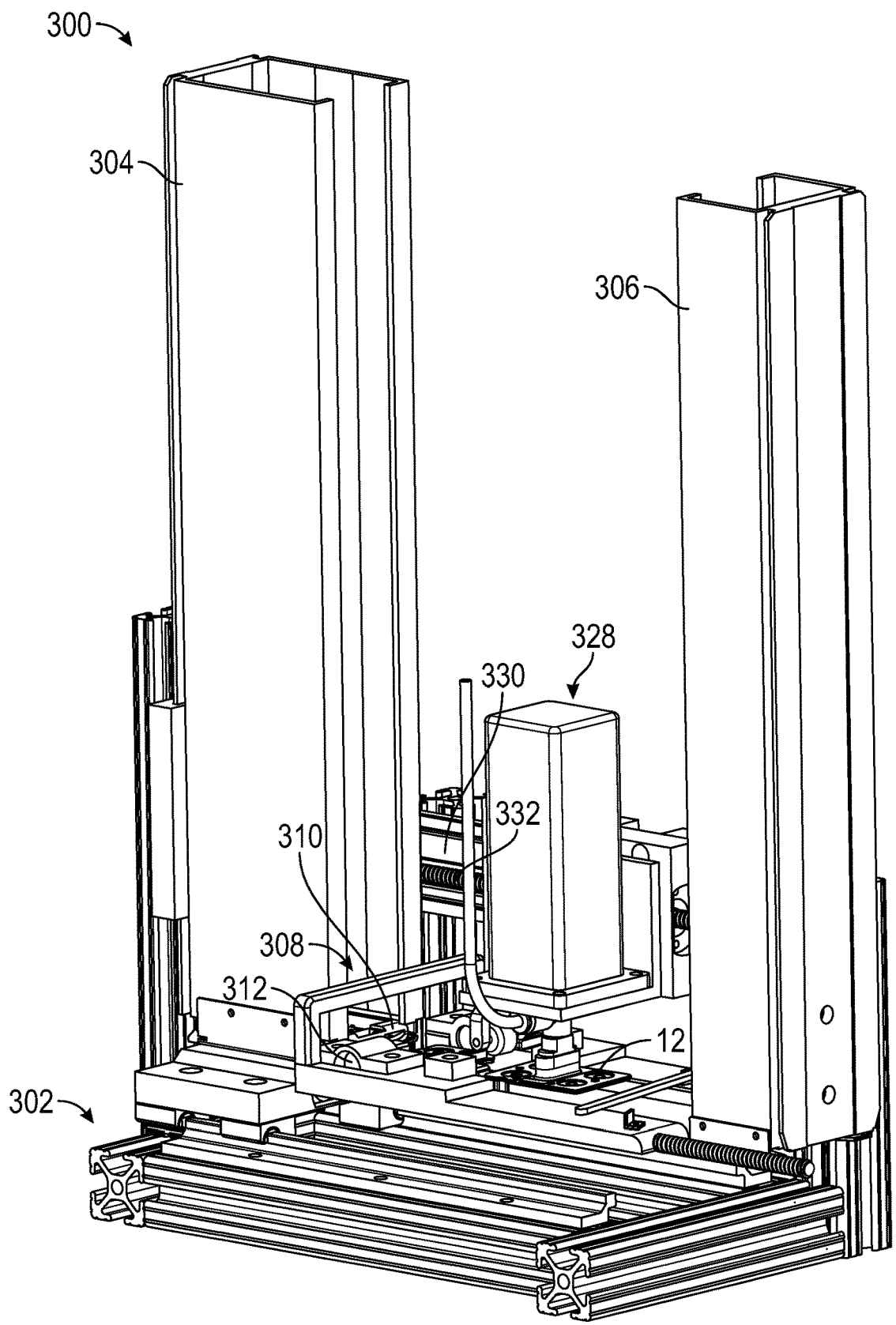
FIG. 10 is a perspective view of an automated system for opening containers, according to one embodiment.

FIG. 10 illustrates a representative embodiment of a system or tool assembly 300 configured to open TLD card containers such as the container 10, remove the TLD card from inside the container, and position the TLD card and the container for further processing. The tool assembly 300 can include a support structure generally indicated at 302, and a first container or cartridge 304 configured to receive a plurality of containers 10 in a stacked arrangement. The containers 10 can contain TLD cards 12 that are ready for removal and processing. The system 300 can further include a second cartridge 306 at the opposite end of the support structure from the first cartridge 304. The second cartridge 306 can be configured to receive TLD cards removed from the containers 10. The system can further comprise a magnet assembly generally indicated at 308, and a shuttle 310 (FIG. 11) configured to move along the support structure 302 relative to the magnet assembly between the cartridges 304 and 306. The magnet assembly 308 can comprise first and second magnets 312 and 314 mounted in respective dome-shaped housings positioned on opposite sides of the shuttle 310. The magnets 312 and 314 can be permanent magnets as described above, or can comprise electromagnets. The system can further comprise a pair of lifting members or ramp members 316 and 318, and a C-shaped catch or support member 320 extending above the magnets 312 and 314. In the illustrated embodiment, the magnets 312 and 314 are positioned between the support member 320 and the ramp members 316, 318, although other configurations are possible.

Figure 11:
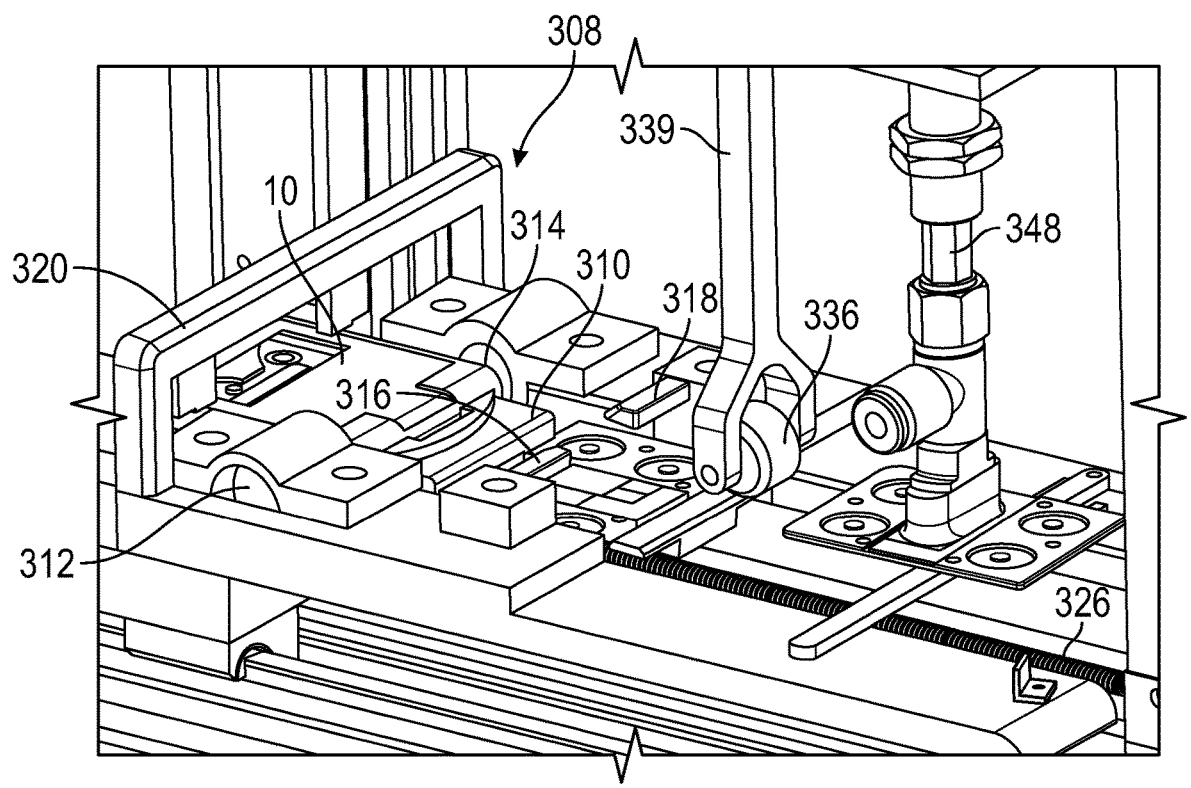
FIG. 11 is a magnified perspective view of a tool assembly of the system of FIG. 10.

The shuttle 310 can comprise a first portion configured as a receptacle, recess, tray, platter, or slot 322 (FIG. 16) and a second portion or slot 324. The first and second slots 322 and 324 can be offset from each other along the z-axis (note Cartesian coordinate axes shown in FIG. 11) such that the first slot is higher than the second slot, although other configurations are possible. Referring to FIG. 11, motion of the shuttle 310 can be along a longitudinal guide, such as a lead screw 326, although other actuators may be used such as worm drives, rack and pinion gears, linear motors, hydraulic actuators, etc.

Figure 12:
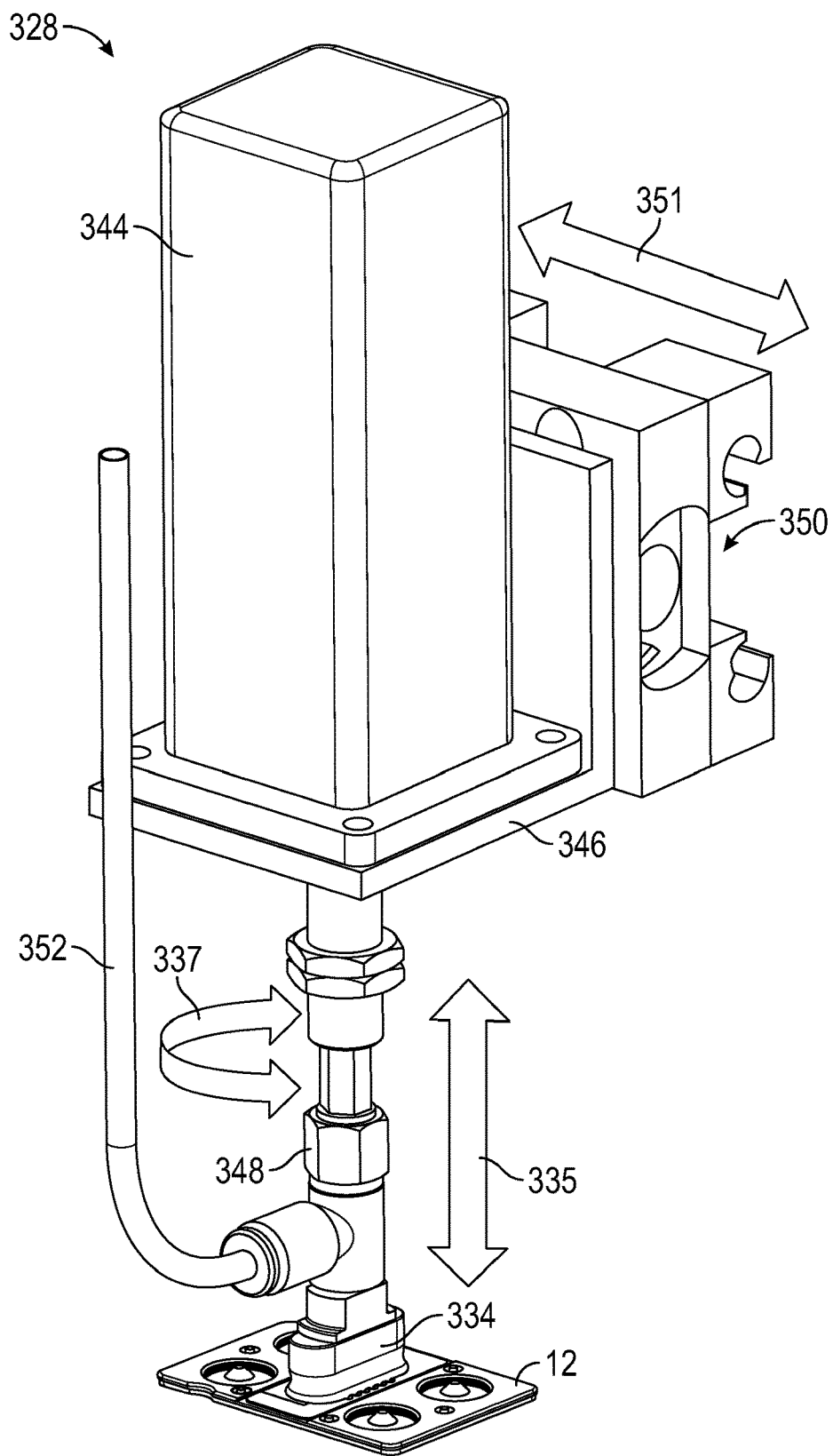
FIG. 12 is a perspective view of a manipulator assembly of the system of FIG. 10.

Referring again to FIG. 10, a manipulator assembly 328 can be positioned above the shuttle 310 and between the cartridges 304 and 306. The manipulator assembly 328 can be coupled to a guide configured as a gantry system 330, and movable longitudinally along the gantry system (e.g., by a lead screw 332 or other actuator system). FIG. 12 illustrates the manipulator assembly 328 in greater detail. The manipulator assembly can comprise a housing 344 coupled to a mounting bracket 346. The housing 344 can contain, for example, motors, pumps, or other electronics. The manipulator assembly 328 can further comprise a manipulator head 334 configured as a vacuum head or vacuum pad, although the manipulator may also comprise one or more of magnets, actuatable grippers, etc. The manipulator head 334 can be coupled to the housing 344 by a linkage 348, which can be configured to move the manipulator head 334 up and down along the z-axis (double-headed arrow 335), and/or rotate the manipulator head about the z-axis (double-headed arrow 337). A supply line 352 can supply vacuum to the manipulator head 334 (e.g., from the housing 344, or from a remote vacuum source). The manipulator assembly 328 can be coupled to the gantry system 330 by a coupling assembly generally indicated at 350 mounted to a flange of the mounting bracket 346, and configured to allow the manipulator assembly to move along the gantry system in the directions indicated by double-headed arrow 351.

Returning to FIG. 11, a roller member 336 can also be coupled to the gantry system 330 via an extension member 339, and can be movable along the gantry independently of, or together with, the manipulator assembly 328.

Figure 13:
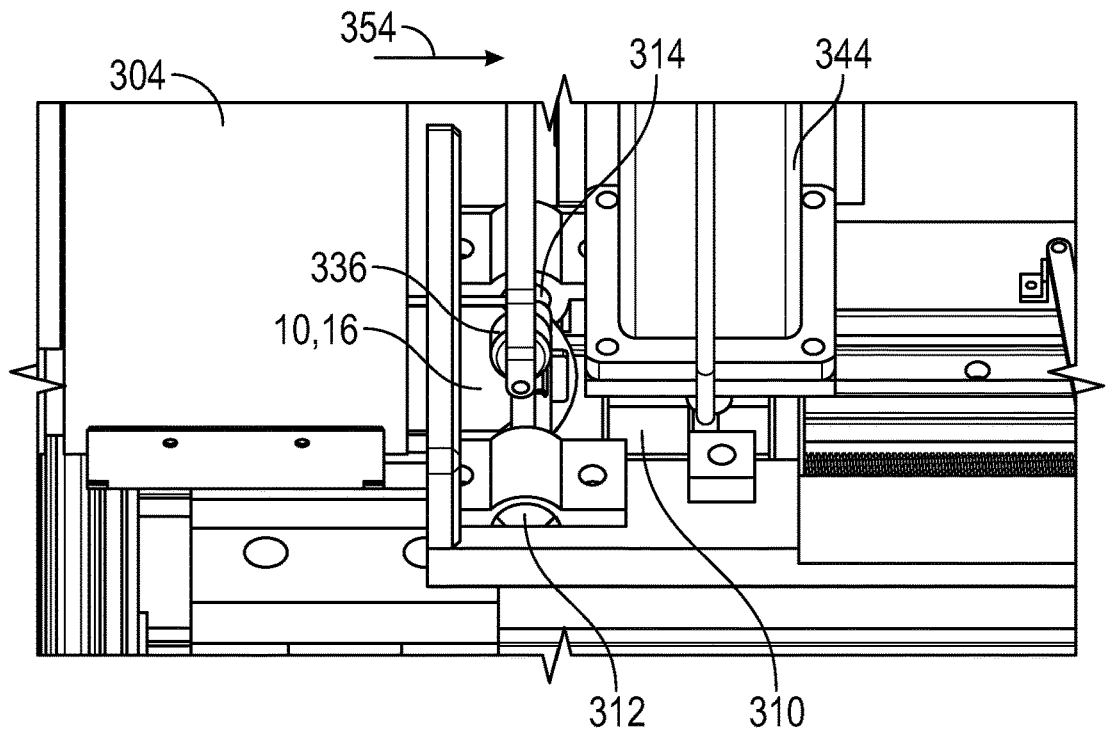
FIGS. 13-20 are magnified perspective views illustrating operation of the system of FIG. 10, according to one embodiment.

The following description proceeds with reference to a container 10 similar to that shown in FIGS. 1-3C. However, the system 300 can be adapted to open and/or close any of the container embodiments described herein. Referring to FIGS. 11-20, in operation the shuttle 310 can move beneath the first cartridge 304. A container 10 can be dispensed or received from the cartridge 304 onto the first slot 322 of the shuttle. Referring to FIG. 13, the shuttle 310 can then move to the right in the direction of arrow 354, where the magnets 312 and 314 can be aligned with the latching assembly 40 of the container 10. In certain embodiments, the roller member 336 can contact the cover member 16 of the container and can compress the gasket inside the container to allow the recesses 28 and 30 (FIGS. 3A-3C) to more fully align with the pin members 48 and 58, as described above. In certain embodiments, this can allow the magnets 312 and 314 to attract the respective pin members and unlatch the cover 16. For other container embodiments not including a sealing member, the roller member 336 can be omitted.

Figure 14:
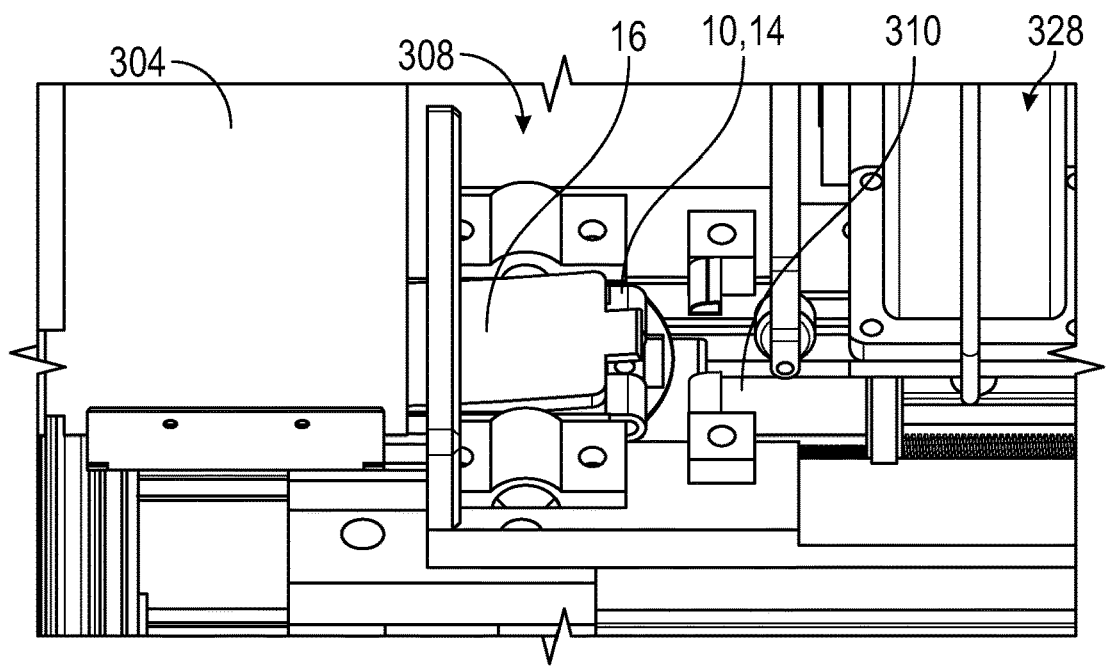

Referring to FIG. 14, once the cover 16 is unlatched, the cover 16 can open, and the shuttle 310 can continue to the right. In certain embodiments, the manipulator system 328 can also move to the right so as not to interfere with the shuttle 310.

Figure 15:
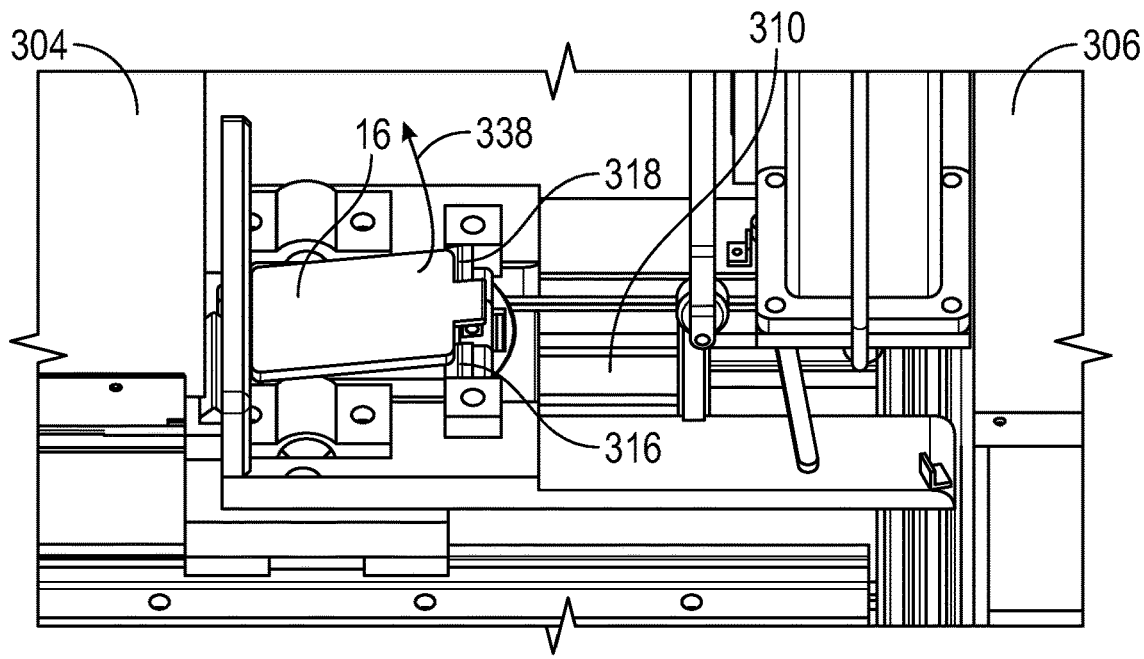
Figure 16:
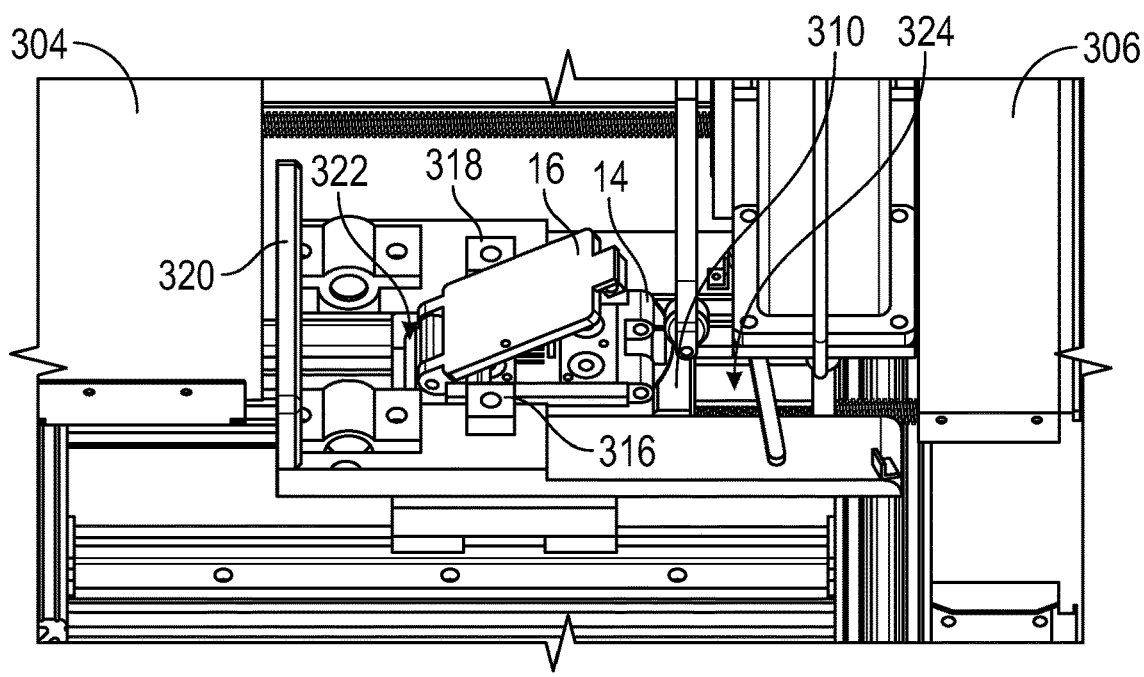

Referring to FIGS. 15 and 16, with the cover 16 unlatched, the shuttle 310 can continue to the right such that the ramp members 316 and 318 engage the cover and pivot the cover in the direction indicated by arrow 338. By traveling a predetermined distance toward the second cartridge 306, the cover member 16 can be fully opened by the ramp members 316 and 318, exposing the TLD card 12 inside the container. The cover member 16 can rest atop the support member 320, as shown in FIG. 17.

Figure 17:
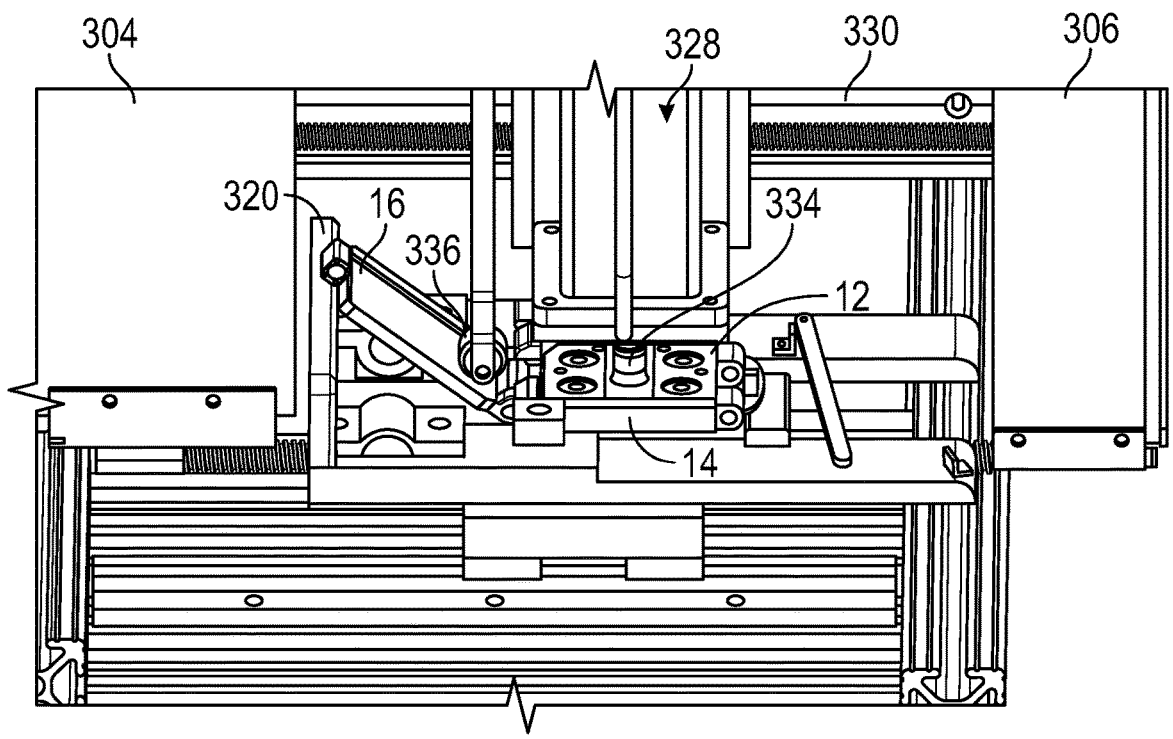

Still referring to FIG. 17, the manipulator assembly 328 can be positioned above the TLD card 12 (e.g., by moving to the left in FIG. 17), and the manipulator head 334 can move downwardly along the z-axis to engage the TLD card 12, and can lift the TLD card out of or off of the container portion 14.

Figure 18:
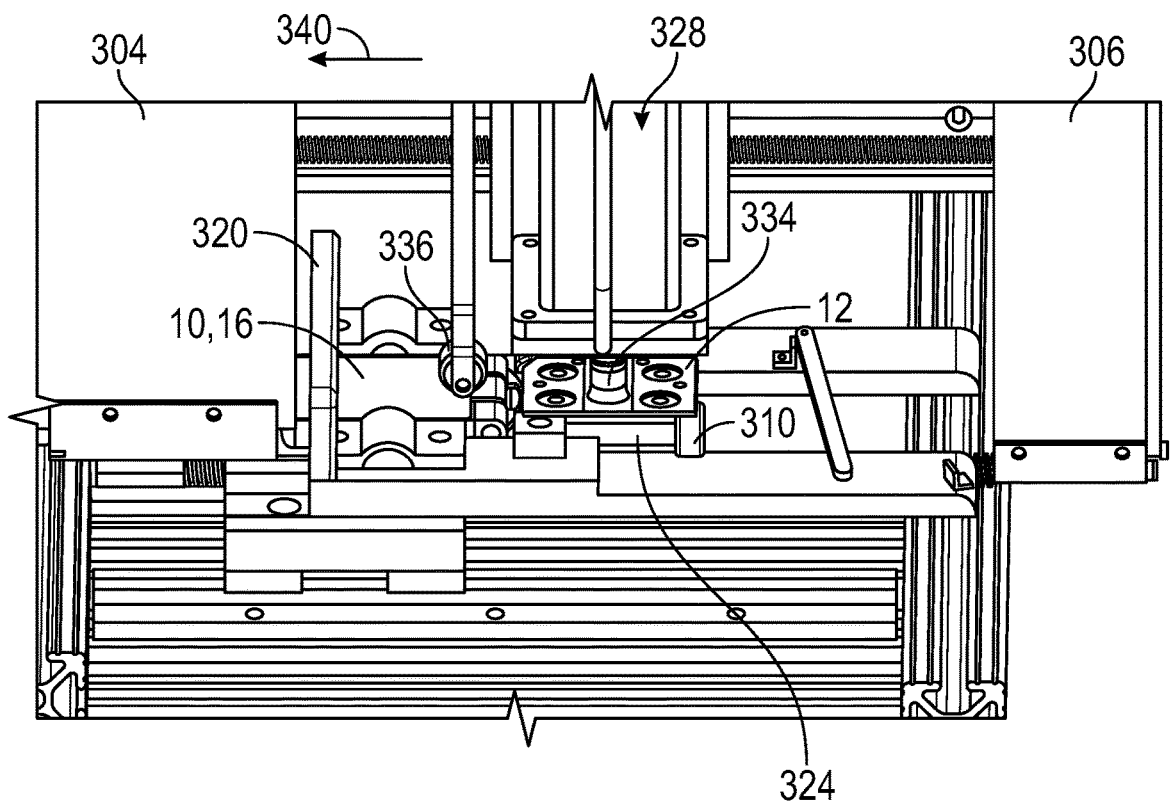

Referring to FIG. 18, the shuttle 310 can then move to the left in the direction of arrow 340. The support member 320 can push the cover 16 of the container toward the closed position, and the second slot 324 of the shuttle can be positioned beneath the manipulator head 334. The roller member 336 can press the cover 16 closed such that the pin members latch with the cover.

Figure 19:
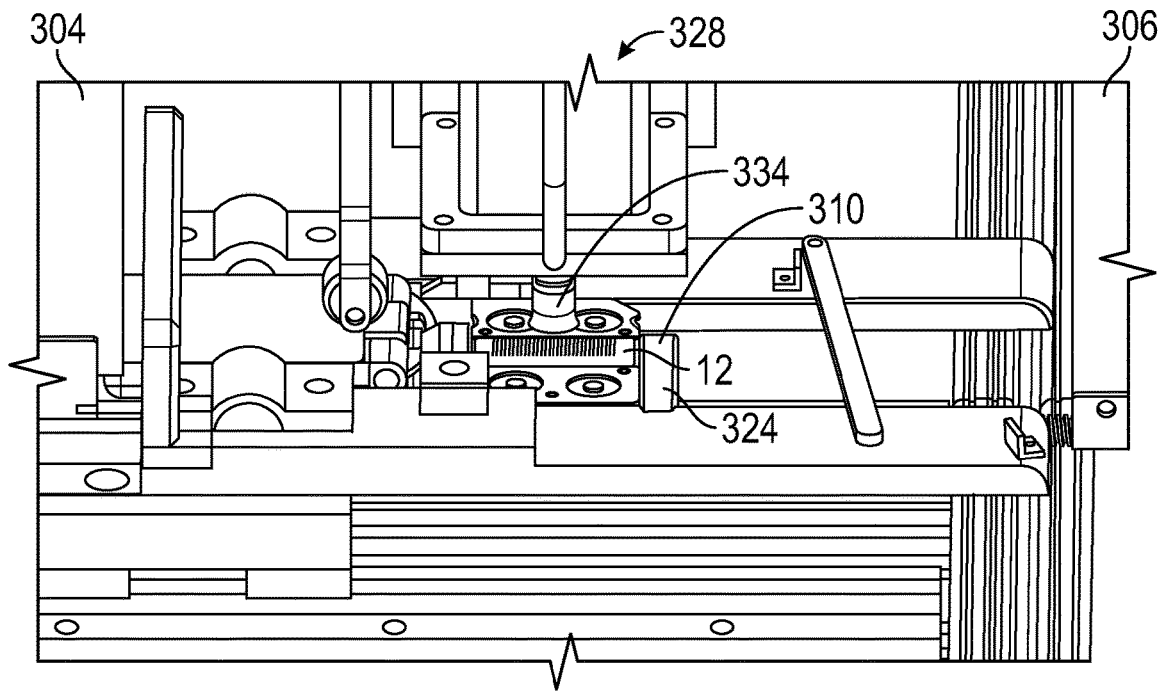

Referring to FIG. 19, the manipulator head 334 can rotate the TLD card 12 (e.g., by 90°) relative to the shuttle 310, lower the TLD card, and release the TLD card into or onto the second slot 324 of the shuttle.

Figure 20:
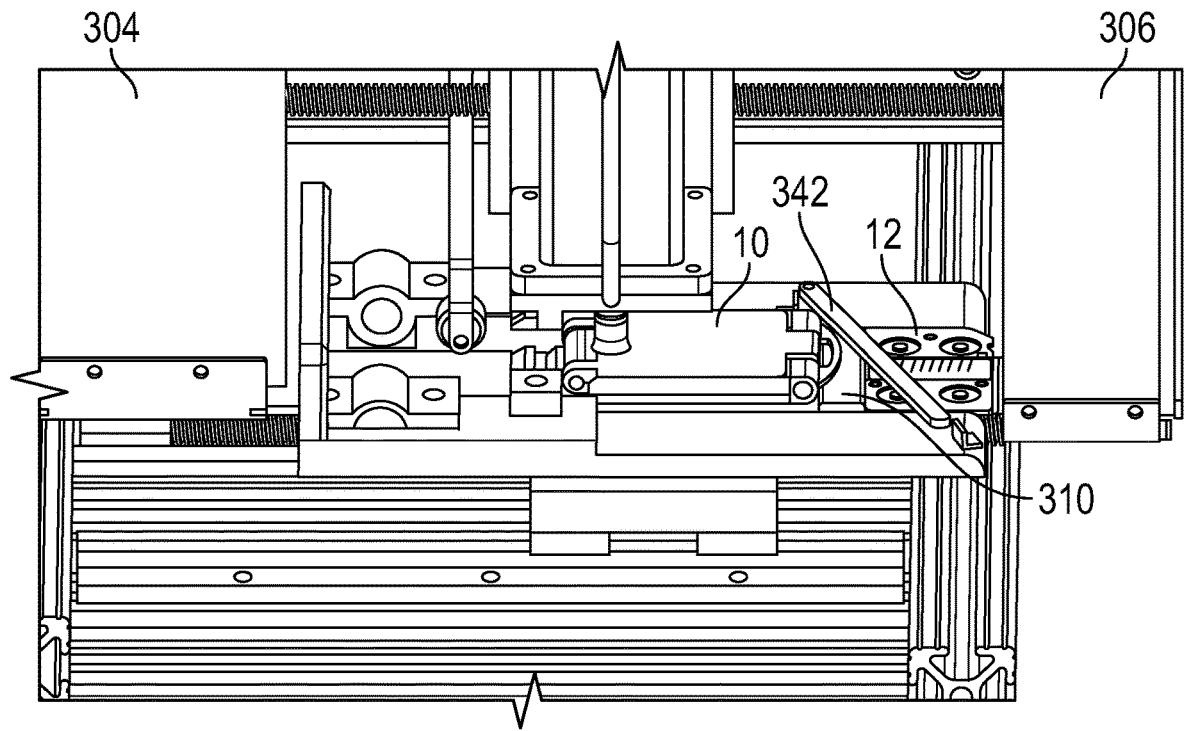
Figure 21:
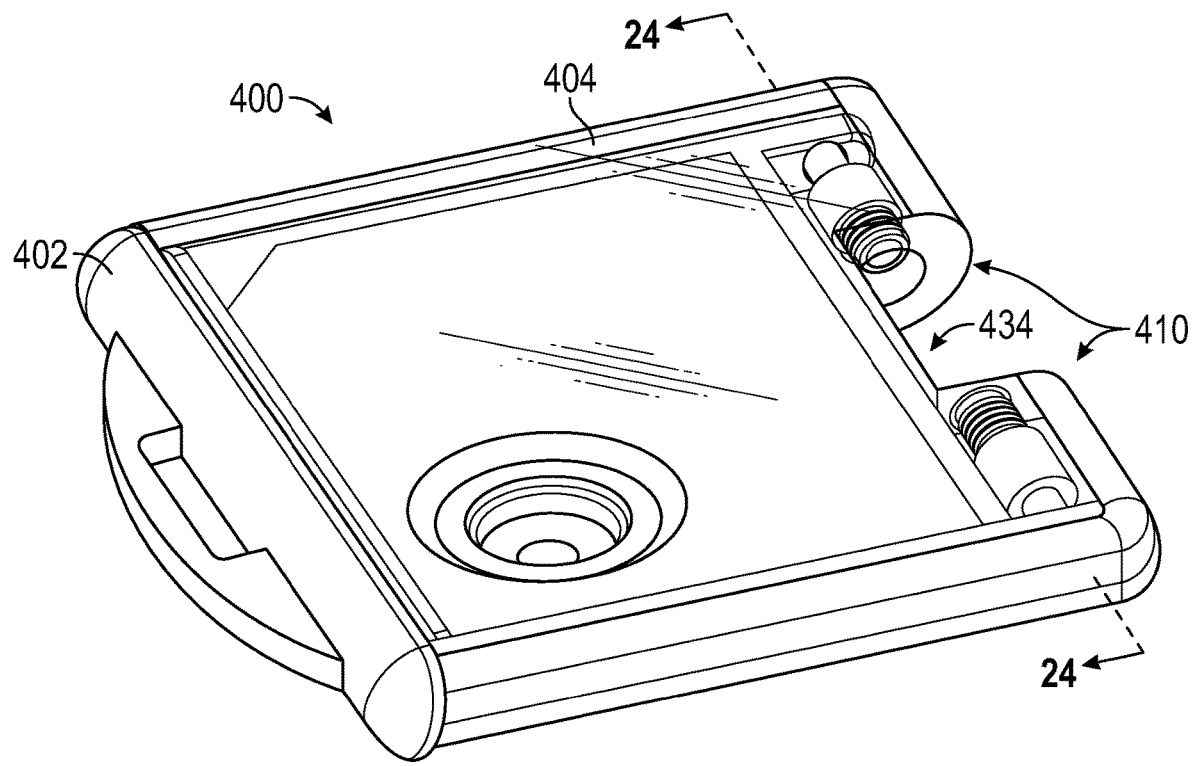
FIG. 21 is a perspective view of a container including a magnetically actuatable latching mechanism and an insert, according to another embodiment.

Referring to FIG. 20, the shuttle 310 can move to the right and the container 10 can contact a lever member 342 positioned across the path of the shuttle to remove the container from the shuttle 310 as the shuttle moves toward the second cartridge 306. Due to the vertical offset between the first and second slots 322 and 324 of the shuttle, the TLD card 12 can pass beneath the lever member 342 without engaging the lever member. The container 10 can be discharged from the shuttle 310 to a hopper or other container for further processing. The TLD card 12 can then be received in the cartridge 306, for example, by being inserted from the bottom. The shuttle 310 can then return to the first cartridge 322 to receive another container 10 and the process can be repeated.

In certain examples, the system 300 can also be operable to load TLD cards into containers. For example, the shuttle 310 can be configured to receive a container 10 from the second cartridge 306, and the manipulator system 328 can be configured to place a TLD card into the container. The container could then be closed as described above. The system 300 can also include additional tools or systems in place of or in addition to the features shown. For example, in certain embodiments the system 300 can comprise, without limitation, a camera, a barcode scanner, and/or a label printer and/or applicator. The system 300 can also include additional cartridges such as for loaded TLD card containers, TLD cards, etc.

Figure 22:
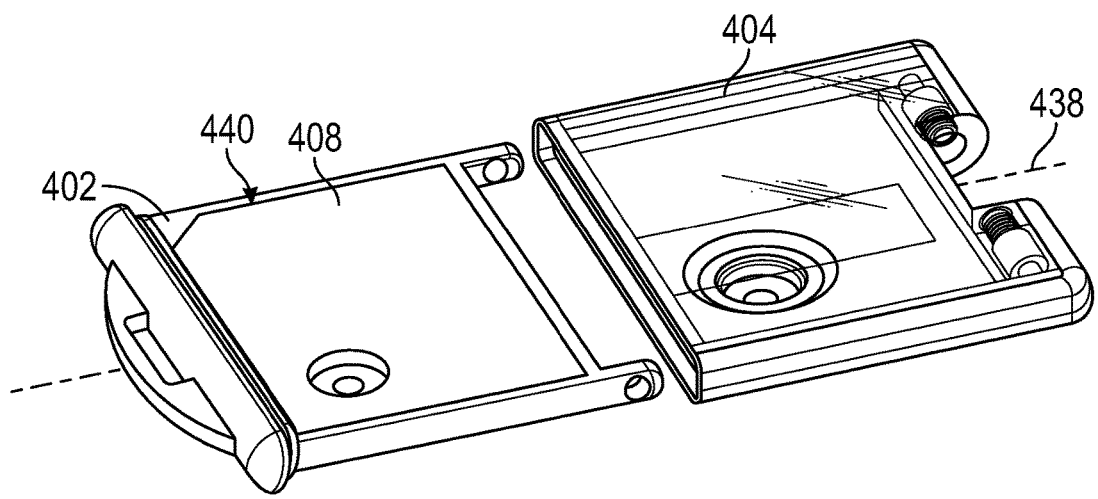
FIG. 22 is a perspective view of the container of FIG. 21 with the insert shown removed from the container portion.
Figure 23:
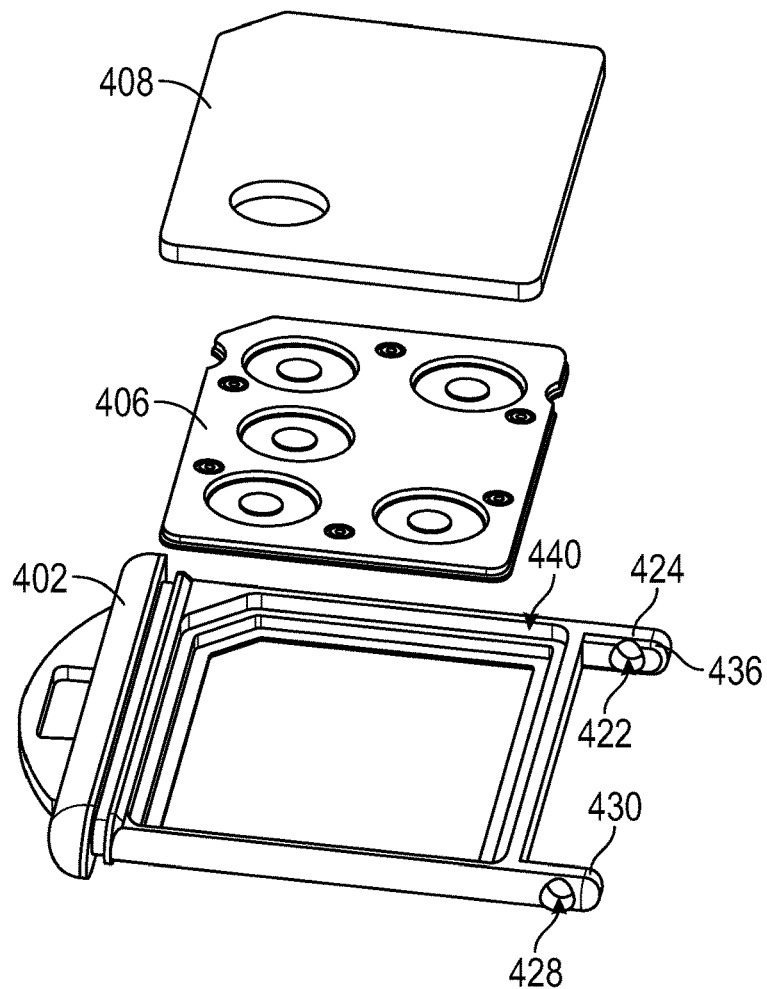
FIG. 23 is a perspective exploded view showing the insert of FIG. 21, a thermoluminescent dosimeter card, and a filter.

FIGS. 21-26 illustrate another embodiment of a container 400 configured as a drawer-style container including a drawer, tray, or insert 402 and a casing, housing, or container portion 404 configured to receive the insert 402. Referring to FIGS. 22 and 23, the insert 402 can comprise a tray portion 440 defining a well 444 configured to receive a TLD card 406 (FIG. 23) and/or a filter member 408 in a stacked arrangement. In certain embodiments, the filter member 408 and/or the filter members incorporated into any of the card holder embodiments described herein, can comprise mylar, aluminum, tin, copper, high-density polyethylene (HDPE), or combinations thereof. Referring to FIG. 23, in the illustrated embodiment the tray portion 440 can be tiered in order to receive a TLD card and a filter of different sizes, although other configurations are possible. The tray portion 440 can further comprise a first leg or extension portion 424 extending from one edge of the tray portion and a second leg or extension portion 430. The extension portion 424 can comprise a recess or opening 422, and the extension portion 430 can define an opening or recess 428.

Figure 24:
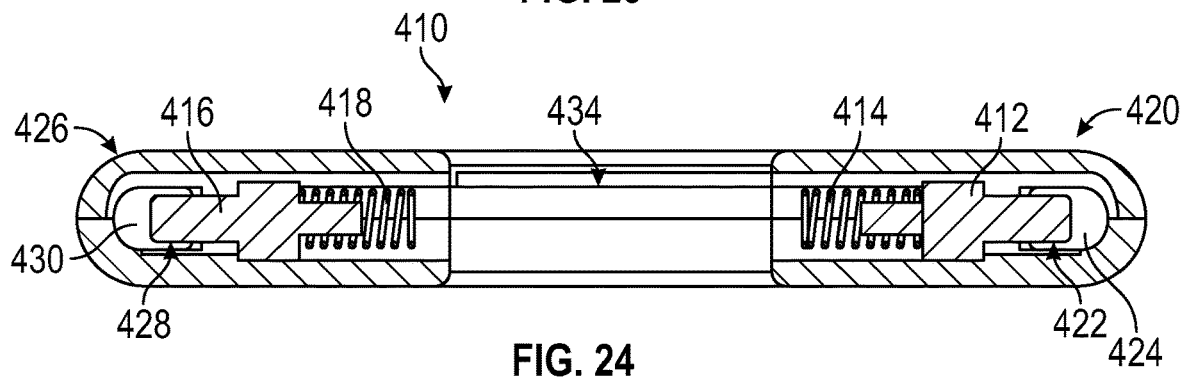
FIGS. 24 and 25 are cross-sectional front elevation views taken along line 24-24 of FIG. 21, illustrating operation of the magnetically actuatable latching assembly of the container.

Returning to FIG. 21, the container portion 404 can comprise a latching assembly 410 including springs and pins similar to the latching assembly 40 of FIG. 1, but with the springs configured to bias the pins outwardly to the side edges of the container. The container portion 404 is shown partially transparent in FIGS. 21 and 22 so that the pin and spring assemblies can be seen, but in practice the container portion may be transparent or opaque. Referring to FIG. 24, the latching assembly 410 can comprise a pin member 412 and a spring 414 on the right side, and a pin member 416 and a spring 418 on the left side. The spring 414 can be configured to bias the pin member 412 toward the edge 420 of the container such that the pin is received in the recess 422 of the extension member 424 of the insert 402. The spring 418 can be configured to bias the pin member 416 toward the edge 426 of the container such that the pin is received in the recess 428 of the extension member 430 of the insert.

Each extension member 424 and 430 can include an angled, chamfered, or beveled surface configured to contact the respective pin member and push the pin member toward the central axis 438 (FIG. 22) of the container portion 404 in order to compress the springs when the insert 402 is received in the container portion. For example, with reference to FIG. 23, the extension portion 424 can include an angled surface 436 on the inside aspect of the extension portion and oriented toward the pin member 412. When the insert 402 is inserted into the container portion 404, the angled surfaces of the extension portions 424 and 430 can contact the pin members 412 and 416, and can move or urge the pin members toward the central axis 438 of the container portion, allowing the extension portions to move past the pin members. When the recesses 422 and 428 align with the pin members, the springs can push the pin members into the respective recess to latch with the insert and lock it inside the container portion 404.

Figure 25:
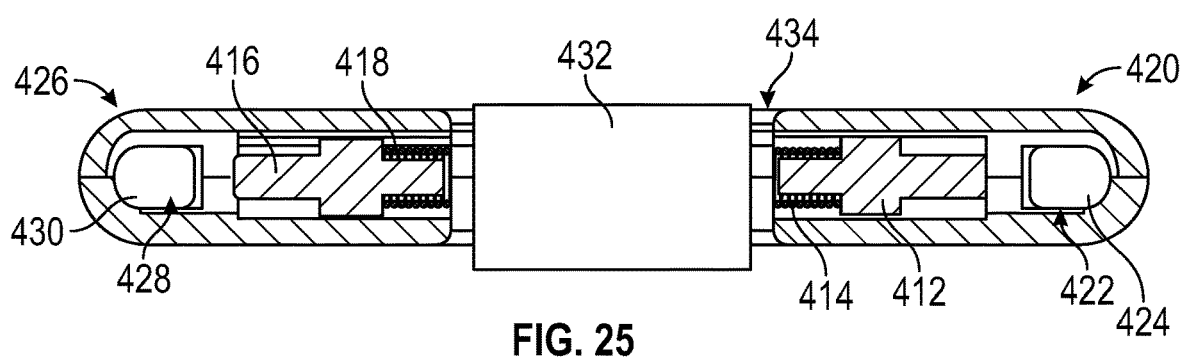
Figure 26:
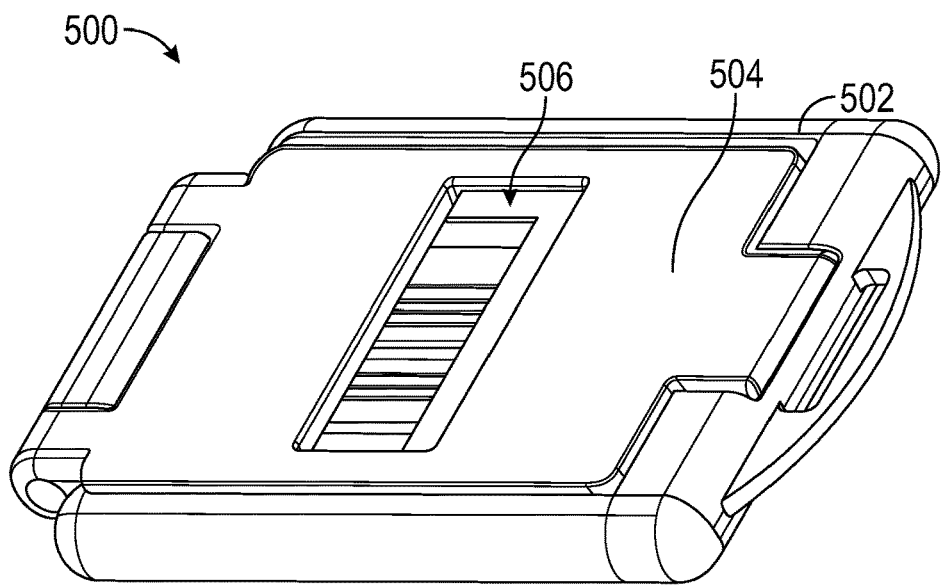
FIG. 26 is a top plan view illustrating the container of FIG. 21 and a tool assembly, according to one embodiment.
Figure 28:
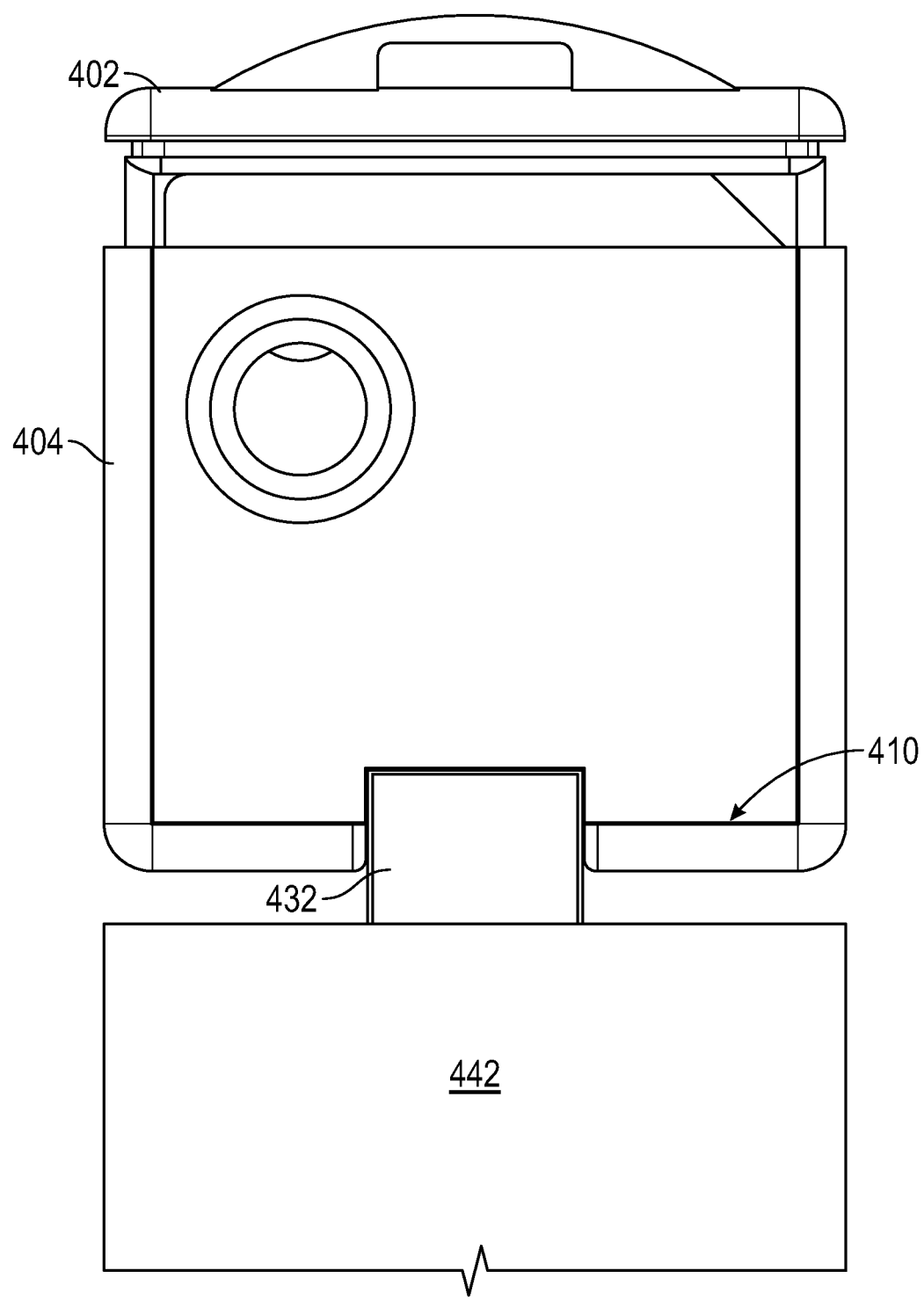
FIG. 28 is a bottom plan view of the container of FIG. 27.

To release the latching assembly 410, a magnet 432 can be inserted into a recess 434 (FIGS. 21, 24, and 25) between the pin members, as shown in FIGS. 25 and 28. The magnet 432 can attract the pin members 412 and 416, compressing the springs 414 and 418, and allowing the insert 402 to be withdrawn from the housing 404, as shown in FIG. 25. In certain embodiments, the magnet 432 can be incorporated into a tool 442 by, for example, being mounted at the end of a tool body as shown schematically in FIG. 26. The tool 442 can be configured as a handheld tool, a desktop tool, and/or an automated tool, as described above.

Figure 27:
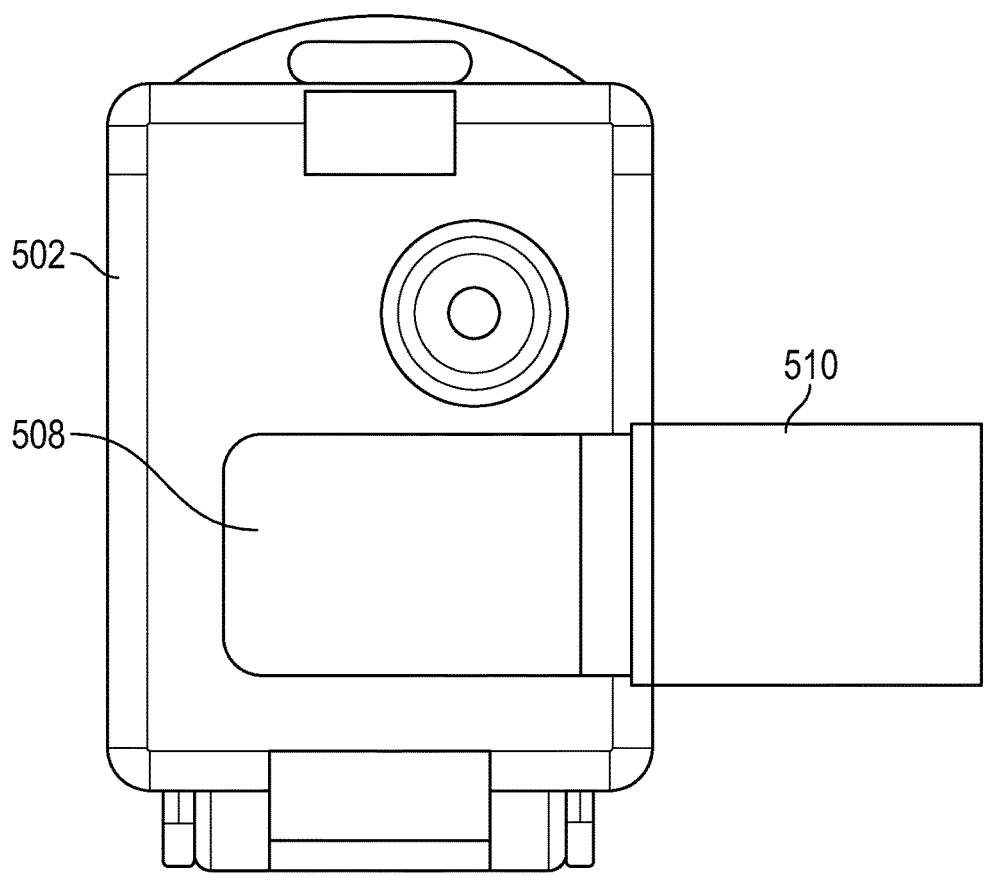
FIG. 27 is a perspective view of a container including a magnetically actuatable latching mechanism, according to another embodiment.

FIGS. 27 and 28 illustrate another embodiment of a container 500 including a container portion 502, a cover portion 504, and a latching assembly similar to the container 10, wherein the cover portion comprises a viewing window or port 506 (FIG. 27), and the container portion includes a slot 508 (FIG. 28) configured to receive a removable substrate, such as a name tag 510 or other identification tag.

Different embodiments of the containers and opener tool assemblies described herein can provide one or more significant advantages over existing TLD card holders and opener systems. For example, fully enclosing the pin member and spring assemblies can impede unauthorized access to the contents of the container because the latching mechanisms cannot be physically accessed. Moreover, the magnetic actuation of the latching assemblies and the positioning of the pins can also increase the difficulty of opening the containers without the disclosed tool assemblies, further enhancing security and tamper resistance. At the same time, the disclosed tool assemblies can allow personnel to easily open the containers and retrieve or replace the TLD cards. The disclosed tool assemblies do not require levering action or other application of force to the body of the container, thereby limiting damage to the container and breakage from repeated opening, as well as reducing ergonomic complications from repeated tool use. The hand-operated and automated tool assembly embodiments described herein can provide the ability to open the containers, remove the TLD cards, and dispatch the containers and TLD cards for further processing in an efficient, secure manner.

Additionally, the containers described herein can include latching assemblies with a single pin member and spring, two pin and spring assemblies, or more. In certain embodiments, a latching assembly including a single pin member and spring can be sufficient to securely close the container and prevent tampering. In other embodiments, two, three, or more pin and spring assemblies can provide enhanced resistance to tampering and/or accidental unlatching due to, for example, strong magnetic fields in the work environment (e.g., from magnetic resonance imaging systems), or accidentally dropping or bumping the container, which may cause a pin and spring to unlatch on one side of the container but not the other. In further embodiments, the pin members and associated cavities can be offset from each other along various axes of the container. For example, the pin members can be offset from each other along the central axis 52 of FIG. 1, and/or offset vertically with respect to the bottom portion of the container.

In certain embodiments, the pin members and springs of the latching assembly can be located in the cover, such as in the projection 27 of FIG. 1 or in the extension portions 424 and 430 of FIG. 23. In such configurations, the pin members can be configured to engage corresponding recesses defined in the container portions 14 or 404. For example, in embodiments where the pin members 48 and 58 are disposed in the cover 16 (e.g., in the projection 27), the container portion 14 can define recesses configured to receive the pin members when the cover is closed. The container portion 14 can also comprise angled surfaces similar to the surfaces 32 and 34 configured to contact the pin members and urge, move, or displace the pin members to the second position during closure of the cover. In yet other embodiments, the cover 16 need not be attached to the container portion 14, but may be separable from the container portion. For example, in certain embodiments the cover 16 can be configured to fit overtop and/or around the sides of the container portion 14 to at least partially enclose the container portion and the TLD card (or other object) contained therein. In such configurations, the pin members 48 and 58 can be disposed in the container portion (as in FIG. 1), or in the cover as described above. In other embodiments, one or more pins can be disposed in the container portion and one or more pins can be disposed in the cover. Any of the tool assemblies described herein can be configured to open containers with the latching mechanisms described above.

In certain embodiments, the cover 16 of the container 10 need not be pivotably coupled to the container portion 14, but can instead be configured as a separable member. For example, in certain embodiments the cover 16 can be configured to be fitted over top or around the container portion 14 to at least partially enclose or encase the container portion and/or the interior volume 70 and the TLD card 12.

Although the containers and latching assemblies are described herein in the context of TLD card containers, the containers and associated latching mechanisms can be used on other types of containers, such as smartphone or tablet cases, identification holders, hard shell cases, wallets, briefcases, drawers, cupboards, or other containers for objects where concealed latching mechanisms may be desirable.

Such latching mechanisms can improve tamper resistance, as noted above, and can also be useful for child proofing. The latching mechanisms described herein can also be adapted for coupling objects together, such as in place of or in addition to other fasteners such as screws, locking tabs, etc.

Explanation of Terms

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present, or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

All features described herein are independent of one another and, except where structurally impossible, can be used in combination with any other feature described herein.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In the following description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

In view of the many possible embodiments to which the principles of the disclosed technology may be applied, it should be recognized that the illustrated embodiments are only examples and should not be taken as limiting the scope of the disclosure. Rather, the scope of the disclosure is at least as broad as the following claims. We therefore claim all that comes within the scope and spirit of these claims.

The invention claimed is:

1. A system, comprising:
   a container, comprising:
   a container portion comprising a latching assembly, the latching assembly comprising a pin member and a biasing member disposed in a cavity defined in the container portion;
   a cover coupled to the container portion and movable between an open position and a closed position to cover an interior volume of the container portion, the cover comprising a recess configured to align with the cavity in the container portion and receive the pin member when the cover is in the closed position; and
   wherein the biasing member is configured to bias the pin member toward a first position to latch the cover to the container portion, the pin member is configured to move to a second position to unlatch the cover from the container portion when aligned with a magnet to attract the pin member and compress the biasing member, and the biasing member is configured to return the pin member to the first position when the pin member is not aligned with the magnet to latch the cover to the container portion; and
   a tool assembly, comprising:
   a slot configured to receive the container; and
   the magnet positioned so as to align with the pin member of the container when the container is received in the slot, the magnet being configured to attract the pin member toward the magnet to compress the biasing member and unlatch the cover from the container portion.

2. The system of claim 1, wherein the tool assembly further comprises:
   a first cartridge configured to receive the container;
   a second cartridge spaced apart from the first cartridge; and
   a shuttle movable between the first and second cartridges, the shuttle comprising the slot configured to receive the container.

3. The system of claim 2, wherein the tool assembly further comprises a manipulator assembly configured to engage a thermoluminescent dosimeter card contained in the container once the container is opened, and remove the thermoluminescent dosimeter card from the container.

4. The system of claim 3, wherein:
   the slot is a first slot; and
   the shuttle further comprises a second slot configured to receive the thermoluminescent dosimeter card.

5. The system of claim 2, wherein the tool assembly further comprises a pair of ramp members configured to engage the cover and pivot the cover to the open position once unlatched as the shuttle moves past the ramp members.

6. The system of claim 1, wherein the tool assembly further comprises a roller member configured to press the cover toward the closed position to align the recess and the cavity such that the magnet of the tool assembly can pull the pin member out of the recess to unlatch the cover.

7. The system of claim 1, wherein:
   the tool assembly is a handheld tool assembly comprising a handle portion and a tool head portion;
   the slot is defined in the tool head portion; and
   the magnet of the tool assembly is positioned in a closed end of the slot.

8. The system of claim 1, wherein the tool assembly comprises a base member having a curved upper surface, and the slot is defined in the base member.

9. A system, comprising:
a container comprising:
a container portion having a first end portion and a second end portion, the second end portion defining a first cavity and a second cavity configured to receive pin members, the first and second cavities being spaced apart by a recess;
a first pin member disposed in the first cavity of the container portion and movable within the first cavity between a first position and a second position;
a first spring disposed in the first cavity and configured to bias the first pin member toward the first position;
a second pin member disposed in the second cavity of the container portion and movable within the second cavity between a first position and a second position;
a second spring disposed in the second cavity and configured to bias the second pin member toward the first position;
a cover coupled to the first end portion of the container portion and movable relative to the container portion between an open position and a closed position, the cover comprising a projection configured to be received in the recess of the container portion when the cover is in the closed position, the projection comprising a first angled surface configured to contact the first pin member and move the first pin member toward the second position in the first cavity, the projection further comprising a second angled surface configured to contact the second pin member and move the second pin member toward the second position in the second cavity as the cover is moved to the closed position; and
wherein the projection is configured to receive the first and second pin members when the cover is in the closed position to lock the cover in the closed position; and
a tool assembly, comprising:
a slot configured to receive the container;
a first magnet positioned so as to align with the first pin member of the container when the container is received in the slot, the first magnet being configured to attract the first pin member toward the first magnet to compress the first spring and unlatch the cover from the container portion; and
a second magnet positioned so as to align with the second pin member of the container when the container is received in the slot, the second magnet being configured to attract the second pin member toward the second magnet to compress the second spring and unlatch the cover from the container portion.

10. The system of claim 9, wherein the tool assembly further comprises:
a first cartridge configured to receive the container;
a second cartridge spaced apart from the first cartridge; and
a shuttle movable between the first and second cartridges, the shuttle comprising the slot configured to receive the container.

11. The system of claim 10, wherein the tool assembly further comprises a manipulator assembly configured to engage a thermoluminescent dosimeter card contained in the container once the container is opened, and remove the thermoluminescent dosimeter card from the container.

12. The system of claim 11, wherein:
the slot is a first slot; and
the shuttle further comprises a second slot configured to receive the thermoluminescent dosimeter card.

13. The system of claim 10, wherein the tool assembly further comprises a pair of ramp members configured to engage the cover and pivot the cover to the open position once unlatched as the shuttle moves past the ramp members.

14. The system of claim 9, wherein the tool assembly further comprises a roller member configured to press the cover toward the closed position to align the recess and the cavity such that the magnet of the tool assembly can pull the pin member out of the recess to unlatch the cover.

15. The system of claim 9, wherein:
the tool assembly is a handheld tool assembly comprising a handle portion and a tool head portion;
the slot is defined in the tool head portion; and
the magnet of the tool assembly is positioned in a closed end of the slot.

16. The system of claim 9, wherein the tool assembly comprises a base member having a curved upper surface, and the slot is defined in the base member.

17. A system, comprising:
a container, comprising:
a container portion defining an interior volume configured to receive an object;
a cover operable to at least partially cover the container portion to enclose the interior volume;
wherein one of the container portion or the cover defines a cavity comprising a pin member disposed in the cavity, the pin member being movable within the cavity between a first position and a second position, the cavity further comprising a biasing member disposed in the cavity and configured to bias the pin member toward the first position;
wherein the other of the container portion or the cover defines a recess configured to receive the pin member when the container portion is covered by the cover, and comprises an angled surface configured to contact the pin member and move the pin member toward the second position in the cavity to compress the biasing member as the cover moves relative to the container portion; and
wherein the recess of the container portion or of the cover is configured to align with the cavity of the other of the container portion or the cover when the cover encloses the interior volume of the container portion such that the biasing member moves the pin member to the first position and the pin member is at least partially received in the recess to secure the container portion and the cover together; and
a tool assembly, comprising:
a slot configured to receive the container; and
a magnet positioned so as to align with the pin member of the container when the container is received in the slot, the magnet being configured to attract the pin member toward the magnet to compress the biasing member and unlatch the cover from the container portion.

18. The system of claim 17, wherein the tool assembly further comprises:
a first cartridge configured to receive the container;
a second cartridge spaced apart from the first cartridge; and
a shuttle movable between the first and second cartridges, the shuttle comprising the slot configured to receive the container.

19. The system of claim 18, wherein the tool assembly further comprises a manipulator assembly configured to engage a thermoluminescent dosimeter card contained in the container once the container is opened, and remove the thermoluminescent dosimeter card from the container.

20. The system of claim 17, wherein:
the tool assembly is a handheld tool assembly comprising a handle portion and a tool head portion;
the slot is defined in the tool head portion; and
the magnet of the tool assembly is positioned in a closed end of the slot.

\* \* \* \* \*